(12) United States Patent
Pottjegort

(10) Patent No.: US 9,805,377 B2
(45) Date of Patent: Oct. 31, 2017

(54) UNIFIED CONTENT VISIBILITY

(75) Inventor: Thomas F. Pottjegort, Diemen (NL)

(73) Assignee: comScore. Inc., Reston, VA (US)

( * ) Notice: Subject to any disclaimer, the term of this patent is extended or adjusted under 35 U.S.C. 154(b) by 0 days.

(21) Appl. No.: 13/352,134

(22) Filed: Jan. 17, 2012

(65) Prior Publication Data
US 2013/0185164 A1    Jul. 18, 2013

(51) Int. Cl.
*G06Q 30/02*    (2012.01)

(52) U.S. Cl.
CPC .................................. *G06Q 30/02* (2013.01)

(58) Field of Classification Search
USPC ........................ 709/204; 715/240; 705/14.45
See application file for complete search history.

(56) References Cited

U.S. PATENT DOCUMENTS

| | | | |
|---|---|---|---|
| 6,064,376 A | 5/2000 | Berezowski | |
| 6,108,637 A | 8/2000 | Blumenau | |
| 7,386,473 B2 | 6/2008 | Blumenau | |
| 7,590,568 B2 | 9/2009 | Blumenau | |
| 7,613,635 B2 | 11/2009 | Blumenau | |
| 7,644,156 B2 | 1/2010 | Blumenau | |
| 7,650,407 B2 | 1/2010 | Blumenau | |
| 7,653,724 B2 | 1/2010 | Blumenau | |
| 7,716,326 B2 | 5/2010 | Blumenau | |
| 7,720,963 B2 | 5/2010 | Blumenau | |
| 7,720,964 B2 | 5/2010 | Blumenau | |
| 7,756,974 B2 | 7/2010 | Blumenau | |
| 2004/0015608 A1 | 1/2004 | Ellis et al. | |
| 2007/0106787 A1 | 5/2007 | Blumenau | |
| 2007/0106792 A1 | 5/2007 | Blumenau | |
| 2008/0102947 A1 | 5/2008 | Hays et al. | |
| 2008/0301741 A1 | 12/2008 | Stern et al. | |
| 2009/0327869 A1 * | 12/2009 | Fan et al. | ........ 715/240 |
| 2010/0088373 A1 * | 4/2010 | Pinkham | ........ 709/204 |
| 2010/0235765 A1 | 9/2010 | Worthington | |

(Continued)

FOREIGN PATENT DOCUMENTS

| | | | |
|---|---|---|---|
| CN | WO 2011075886 A1 * | 6/2011 | |
| WO | 9810349 A2 | 3/1998 | |

OTHER PUBLICATIONS

Tinic Uro, "Timing it right", kaourantin.net: Timing it right, Mar. 1, 2010, pp. 1-11, http://www.kaourantin.net/2010/03/timing-it-right.html.

(Continued)

*Primary Examiner* — Afaf Ahmed Osman Bilal Ahme
(74) *Attorney, Agent, or Firm* — Baker & Hostetler LLP

(57) ABSTRACT

Methods, systems, and computer-readable media for determining the visibility of downloaded objects, such as electronic advertisements, on a client device screen comprise consulting one or more draw-count properties associated with the advertisement, such as screen-draw-count, window-draw-count, or document-draw-count properties; and determining whether the advertisement was likely visible based on the one or more draw-count properties. A plurality of objects, such as transparent pixel images may also be placed on or around the advertisement and their draw-counts compared. If only some of the transparent pixel images have non-zero draw-counts, then it may be inferred that only a portion of the advertisement was visible on the client device screen.

12 Claims, 12 Drawing Sheets

(56) References Cited

U.S. PATENT DOCUMENTS

| | | | |
|---|---|---|---|
| 2010/0299604 A1 | 11/2010 | Blumenau | |
| 2011/0035274 A1* | 2/2011 | Goel et al. | 705/14.45 |
| 2012/0272256 A1 | 10/2012 | Bedi | |
| 2012/0311627 A1 | 12/2012 | Cho | |
| 2012/0324098 A1 | 12/2012 | De Jager et al. | |
| 2013/0167005 A1 | 6/2013 | Corbett et al. | |

OTHER PUBLICATIONS

Non-Final Office Action dated May 27, 2014, U.S. Appl. No. 14/212,363, filed Mar. 14, 2014, pp. 1-16.
Non-Final Office Action dated Aug. 19, 2016, U.S. Appl. No. 14/212,363, pp. 1-25.
Non-Final Office Action dated Sep. 22, 2016, U.S. Appl. No. 11/640,125, pp. 1-28.
Final Office Action dated Jul. 24, 2015, U.S. Appl. No. 14/212,363, pp. 1-32.
Final Office Action dated May 5, 2016, U.S. Appl. No. 14/213,308, pp. 1-18.
"Using PC Hardware more efficiently in HTML5: New Web Performance APIs, Part 2", IEBlog, Jul. 8, 2011, pp. 1-6, retrieved from https://social.msdn.microsoft.com/profile/ieblog on Jun. 27, 2016.
"Check if element is visible after scrolling", Javascript, 2009, pp. 1-15, retrieved from http://stackoverflow.com/questions/487073/checkifelementisvisibleafferscrolling on Jun. 27, 2016.
"jQuery—test if element is in viewport (visible on screen)", Javascript, jQuery, Aug. 8, 2012, pp. 1-19, retrieved from http://upshots.org/javascript/jquery/test-if-element-is-in-viewport-visible-on-screen on Jun. 27, 2016.
"Get the size of the screen, current web page and browser window" Javascript, 2011, pp. 1-8, retrieved from http://stackoverflow.com/questions/3437786/getthesizeofthescreencurrentwebpageandbrowserwindow on Jun. 27, 2016.
"Page Visibility", W3C, Jun. 2, 2011, pp. 1-5, retrieved from https://www.w3.org/TR/2011/WDpagevisibility20110602/ on Jun. 27, 2016.
"Document Object Model (DOM) Level 3 Core Specification", W3C, Apr. 7, 2004, pp. 1-216, retrieved from http://www.w3.org/TR/2004/REC-DOM-Level-3-Core-20040407 on Jun. 27, 2016.
Revision 26393 of Page Visibility API, MDN, Dec. 20, 2011, pp. 1-3, retrieved from https://developer.mozilla.org/enUS/docs/Web/API/Page_Visibility_API$revision/26393 on Jun. 27, 2016.
"Revision 10192 of Document.width", MDN, Sep. 27, 2011, pp. 1-2, retrieved from https://developer.mozilla.org/enUS/docs/Web/API/Document/width$revision/10192 on Jun. 27, 2016.
"Revision 9619 of Document.height", MDN, Sep. 7, 2011, pp. 1-2, retrieved from https://developer.mozilla.org/enUS/docs/Web/API/Document/height$revision/9619 on Jun. 27, 2016.
"Revision 236077 of Window.mozInnerScreenY", MDN, Sep. 1, 2009, pp. 1-2, retrieved from https://developer.mozilla.org/enUS/docs/Web/API/Window/mozInnerScreenY$revision/236077 on Jun. 27, 2016.
"Revision 236078 of Window.mozInnerScreenX", MDN, Sep. 1, 2009, pp. 1-2, retrieved from https://developer.mozilla.org/enUS/docs/Web/API/Window/mozInnerScreenX$revision/236078 on Jun. 27, 2016.
"Revision 109562 of Window.mozPaintCount", MDN, Aug. 11, 2010, p. 1, retrieved from https://developermozilla.org/enUS/docs/Web/API/Window/mozPaintCount$revision/109562 on Jun. 27, 2016.
"Revision 286918 of Window.innerWidth", MDN, Oct. 1, 2011, pp. 1-2, retrieved from https://developer.mozilla.org/enUS/docs/Web/API/Window/innerWidth$revision/286918 on Jun. 27, 2016.
"Revision 286917 of Window.innerHeight", MDN, Dec. 8, 2011, pp. 1-4, retrieved from https://developer.mozilla.org/enUS/docs/Web/API/Window/innerHeight$revision/286917 on Jun. 27, 2016.
"Window—Web APIs", MDN, pp. 1-15, retrieved from https://developermozilla.org/enUS/docs/Web/API/Window on Jun. 27, 2016.
"Added example page and more tests", GITHUB, Nov. 23, 2010, pp. 1-3, retrieved from https://github.com/protonet/jquery.inview/commit/a32448e36cd8b295bc6a62427febe9d3ca3c5675 on Jun. 27, 2016.
"A jQuery plugin that adds a bindable 'inview' event for detecting when an element is scrolled into view" GITHUB, pp. 1-3, retrieved from https://github.com/protonet/jquery.inview on Jun. 27, 2016.
"Revision 26393 of Page Visibility API", MDN, Dec. 20, 2011, pp. 1-3, retrieved from https://developer.mozilla.org/enUS/doc/Web/API/Page_Visibility_API$revision/26393 on Jun. 27, 2016.
Non-Final Office Action dated Oct. 8, 2015, U.S. Appl. No. 14/213,308, filed Mar. 14, 2014, pp. 1-21.

* cited by examiner

FIG. 2

```
800 ⸺ <iframe src="http://www.example.org/getAd.php?siteID=867530" width="300" height="300"></iframe>

810 ⸺ <img id="ad_06131953" src="http://www.example.org/ads/ad_06131953.jpg"/>            ~ 812
       <script type="text/javascript"
         src="www.example.net/getVisibility_Code.aspx?ad_name=ad_06131953&site_id=867530"/>  ~ 814

820 ⸺ viewed = false;
       impression_window = 30000;
       t = 0;
       while (t <= impression_window) {
         if (ad_06131953.window_draw_ccount > 0) {
           viewed = true;
           break;                                    ⎫
         } else {                                    ⎬ 822
           sleep(100);                               ⎪
           t += 100;                                 ⎭
         }
       }
       reportVisibility (viewed);

function reportVisibility(bool viewed) {
         msg = new XMLHttpRequest();
         if (viewed) {
           url = "www.example.net/visibilityMetrics.aspx?siteID=867530&adID=06131953&visible=true";   ~ 824
         } else {
           url = "www.example.net/visibilityMetrics.aspx?siteID=867530&adID=06131953&visible=false";  ~ 826
         }
         msg.open("GET", url,false);
         xmlhttp.send();
       }
```

Fig. 8

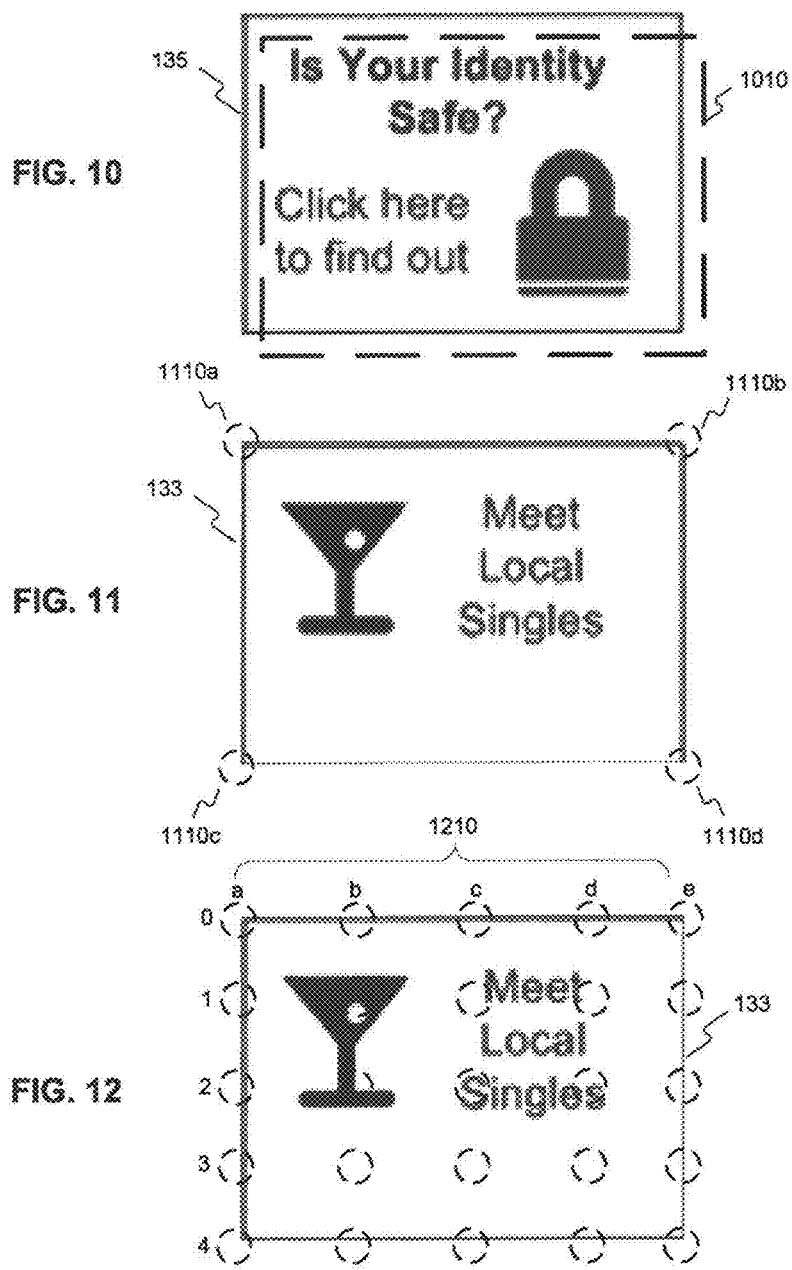

UNIFIED CONTENT VISIBILITY

TECHNICAL FIELD

The present disclosure relates generally to methods, systems, and computer-readable media for determining the visibility of advertisements on client devices.

BACKGROUND

In the area of online advertising, an advertiser, such as a company that is selling goods or services or a non-profit entity advancing a particular cause, pays a website owner, known as a "publisher," to include the advertiser's advertisements into one or more of the publisher's webpages. An advertiser may have its advertisements displayed through multiple publishers or third party advertising networks/brokers, and a publisher may display advertisements from multiple advertisers or third party advertising networks/brokers on any one of its webpages.

FIG. 1 depicts an example of a publisher webpage 120 that includes a plurality of advertisements 131-133. Advertisements 131-133 may comprise image files, Flash™ files, textual elements, or any other kinds of objects or elements that may be used to market products or services. Typically, rather than hosting advertisements 131-133 directly on its server, the publisher will include links or elements (known as "ad-codes") into the hypertext markup language (HTML) of webpage 120. The ad-codes will instruct users' browsers to retrieve advertisements from ad-servers operated by advertisers or from ad-servers operated by third-party intermediaries, such as advertising networks or brokers. FIG. 1 depicts an exemplary webpage 120 as it might be rendered by a web browser 110 on a client device after having retrieved both the HTML of the webpage from the publisher and advertisements 131-133 from their respective advertisers or third party advertising networks.

In an impression- or view-based advertising compensation model, a publisher may earn a commission from an advertiser each time that a webpage containing an advertisement is viewed by a user. Typically, an advertiser or ad-server will track the number of distinct views by simply counting the total number of hypertext transfer protocol (HTTP) requests made by users to download the advertisement from a server operated by the advertiser or third-party ad network that hosts the advertisement file(s). However, one significant drawback to this approach is that even if an advertisement is downloaded by a browser, it may never actually be displayed in a visible area of its parent webpage and, thus, could not actually be viewable by a user.

For example, FIG. 2 depicts publisher webpage 120 in its entirety—that is, representing all of the content encoded in its corresponding HTML file. FIG. 2 also depicts the viewport 112 of browser 110 in the form of a dashed-line box. Viewport 112 may represent the portion of webpage 120 that is being displayed in or otherwise in focus within browser 110 at any given time. By comparing FIGS. 1 and 2, it can be seen that viewport 112 encompasses only a portion of webpage 120, with the rest of the page running outside the visible area of the browser, a phenomenon sometimes referred to as "page-clipping." For example, although advertisements 134 and 135 are also included within webpage 120, these advertisements will not be displayed in viewport 112 unless a user instructs browser 110 to scroll downward.

Moreover, even if an advertisement is contained within the viewport of a browser, there may be other reasons why it may nevertheless not be visible on a client device screen. For example, as depicted in FIG. 3, in some operating systems, the window of browser 110 may be positioned within a graphical user interface (GUI) desktop 300 such that a portion of the window runs off of the visible area of the device screen, a phenomenon sometimes referred to as "screen-clipping." In the example of FIG. 3, even if advertisements 131-133 were within the viewport of browser 110, such advertisements might never be displayed to a user if they were positioned only within a screen-clipped area of the viewport.

Similarly, as depicted in FIG. 4, objects within a webpage might not be visible to a user, even if they are included in the viewport of the browser, if they are positioned within an area of the viewport that is obscured by another window or object. For example, as depicted in FIG. 4, although advertisements 131-133 are within the viewport of browser 110, only advertisement 133 is visible, advertisements 131 and 132 being obscured by another window 400.

An advertisement may not be visible, or fully visible, on a device screen for other reasons, despite having been downloaded by a browser. For example, a webpage may be downloaded and rendered in a separate browser window or tab that the user never brings to the foreground, or an advertisement may be contained within an area of a publisher webpage that has smaller dimensions than the dimension of the advertisement, in which case the advertisement may be only partially displayed.

In any of these and other cases in which an advertisement is downloaded but not displayed, or not fully displayed, on a client device screen, an advertiser or third-party ad network may nevertheless credit the publisher with a view, since, absent manual inspection of the publisher webpage, the advertiser or third-party ad network will know only that the advertisement was downloaded by the user. Asia result, advertisers may pay commissions for a significant number of downloaded advertisements that were never actually visible (or could never have been visible) to users. This could result in advertisers being susceptible to fraudulent activity designed to illegitimately increase impression counts without actually displaying the requested advertisements to end-users.

Accordingly, online advertising may be improved by techniques for determining accurate view-counts for electronic advertisements that do not rely merely on download statistics, but are also able to determine whether electronic advertisements have been displayed in a viewable area of client device screens.

SUMMARY

The present disclosure presents these and other improvements to online advertising. In some embodiments, a browser may receive a piece of client-side code in connection with an advertisement. The client-side code may determine whether the advertisement has been visible within a client application by consulting one or more window-draw-count properties associated with the advertisement. In one embodiment, if the advertisement has a non-zero window-draw-count, it may be inferred that the advertisement was visible in the client application at some point. In another embodiment, a plurality of objects, such as transparent pixel images, may be placed on or around the advertisement. If only some of the transparent pixel images have non-zero window-draw-counts, then it may be inferred that only a portion of the advertisement was visible.

In another embodiment, for browsers that do not expose window-draw-count properties for images or other objects, the client-side code may attempt to draw (or repeatedly redraw) a first reference image in the webpage on or near the advertisement and a second reference image in an area of the webpage that is guaranteed or likely to be non-visible. The client-side code may maintain document-draw-count metrics associated with the first and second reference images that reflect the success or failure of the draw attempts and/or the draw-frequency of each reference image. If the values of document-draw-count metrics associated with the first reference image are substantially similar to the values of the document-draw-count metrics associated with the second reference image, then it may be deduced that the first reference image, like the second reference image, was never visible, and, thus, the advertisement was also never visible.

Additional objects, advantages, and embodiments of the invention will be set forth in part in the description that follows, and in part will be obvious from the description, or may be learned by practice of the invention. The objects, advantages, and embodiments of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings:

FIG. 2 is a diagram depicting an exemplary comparison between a publisher webpage that includes third-party advertisements and a web browser viewport, consistent with certain disclosed embodiments;

FIG. 8 is a diagram depicting an exemplary ad-code that may be used to serve an online advertisement to a client device, track the visibility of the advertisement on the client device, and report the visibility to a metric server, consistent with certain disclosed embodiments;

FIG. 10 is a diagram depicting an exemplary method of using a transparent reference image to measure the visibility of an advertisement, consistent with certain disclosed embodiments;

FIG. 11 is a diagram depicting an exemplary method of using a plurality of transparent reference images to measure the visibility of an advertisement, consistent with certain disclosed embodiments;

FIG. 12 is a diagram depicting an exemplary method of using a plurality of transparent reference images to measure the visibility of an advertisement, consistent with certain disclosed embodiments;

DETAILED DESCRIPTION

Figure 1:
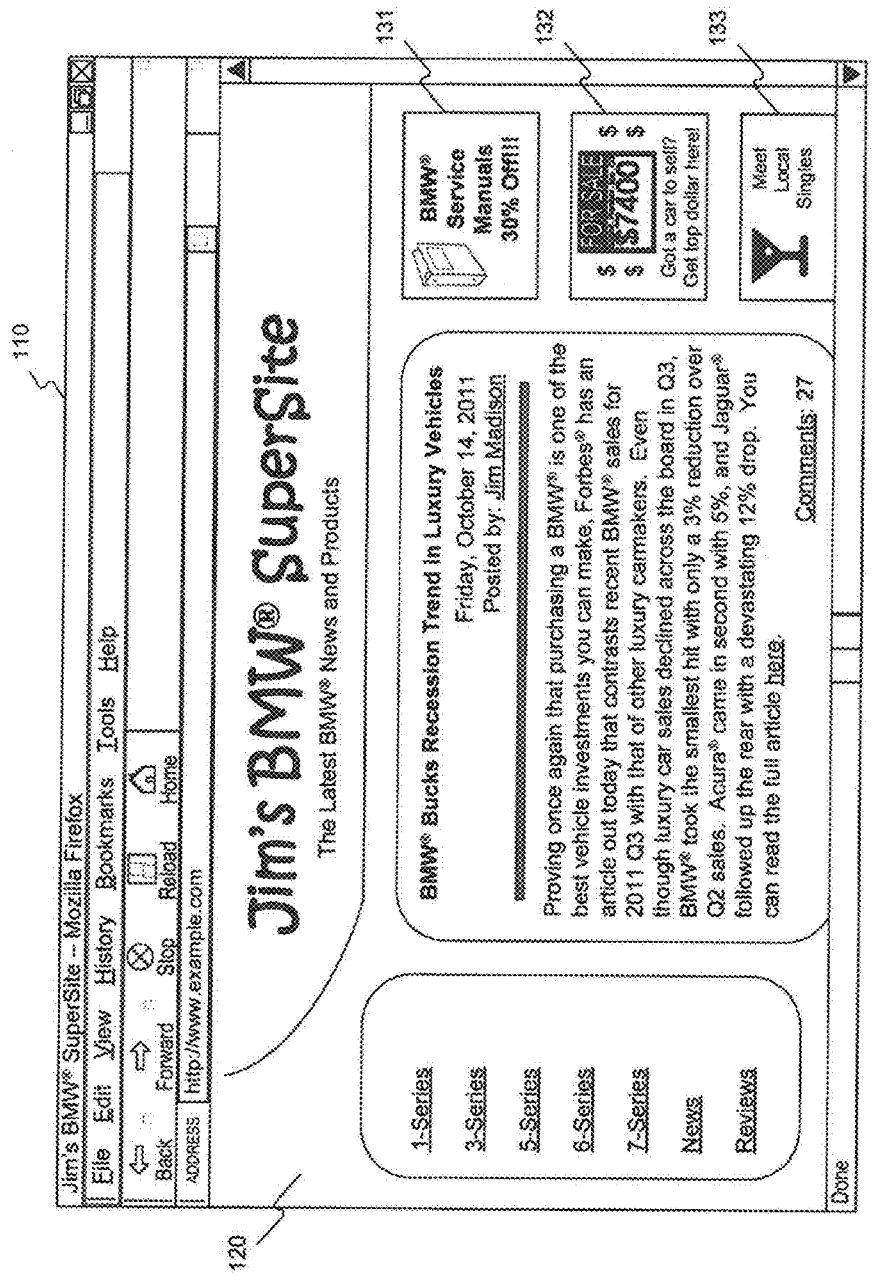
FIG. 1 is a diagram depicting an exemplary publisher webpage that includes third-party advertisements, as rendered by a web browser and displayed on a client device screen, consistent with certain disclosed embodiments.

The following detailed description refers to the accompanying drawings. Wherever convenient, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims. In the following detailed description and in the accompanying drawings, all trademarks belong to their designated owners and are used in this application solely for illustration or technical description purposes.

Figure 5:
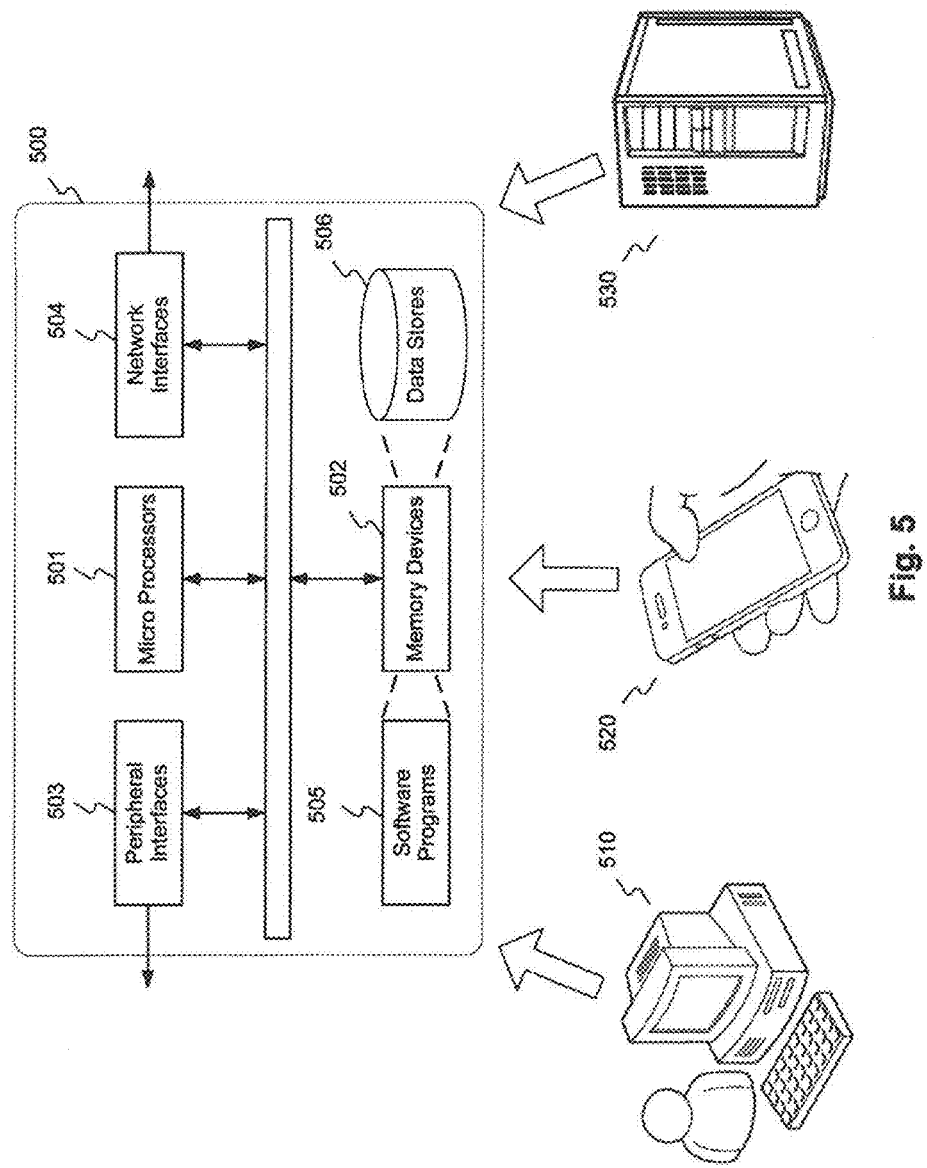
FIG. 5 is a diagram depicting an exemplary hardware configuration for various devices that may be used to perform one or more operations of the described embodiments, consistent with certain disclosed embodiments.

FIG. 5 is a diagram depicting an exemplary hardware configuration for various devices that may be used to perform one or more operations of the described embodiments. As further described below, operations for determining the visibility of an advertisement on a client device may be performed by the client device itself, which may be, for example, a traditional personal computing device 510, such as a desktop or laptop computer, a mobile device 520, such as a smartphone or tablet, a kiosk terminal, a global position system (GPS) device, etc. The client device may receive client-side code for performing ad-visibility determinations from one or more external devices 530, such as a web server involved in serving webpages, advertisements, or ad-codes to the client device.

Any of devices 510-530 may comprise one or more microprocessors 501 of varying core configurations and clock frequencies; one or more memory devices or computer-readable media 502 of varying physical dimensions and storage capacities, such as flash drives, hard drives, random access memory, etc., for storing data, such as images, files, and program instructions for execution by one or more microprocessors 501; one or more network interfaces 504, such as Ethernet adapters, wireless transceivers, or serial network components, for communicating over wired or wireless media using protocols, such as Ethernet, wireless Ethernet, code divisional multiple access (CDMA), time division multiple access (TDMA), etc.; and one or more peripheral interfaces 503, such as keyboards, mice, touchpads, computer screens, touchscreens, etc., for enabling human interaction with and manipulation of devices 510, 520, or 530. In some embodiments, the components of devices 510, 520, or 530 need not be enclosed within a single enclosure or even located in close proximity to one another.

Memory devices 502 may further be physically or logically arranged or configured to provide for or store one or more data stores 506, such as one or more file systems or databases, and one or more software programs 505, which may contain interpretable or executable instructions for performing one or more of the disclosed embodiments. Those skilled in the art will appreciate that the above-described componentry is exemplary only, as devices 510, 520, and 530 may comprise any type of hardware componentry, including any necessary accompanying firmware or software, for performing the disclosed embodiments. Devices 510, 520, or 530 may also be implemented in part or in whole by electronic circuit components or processors, such as application-specific integrated circuits (ASICs) or field-programmable gate arrays (FPGAs).

Figure 6:
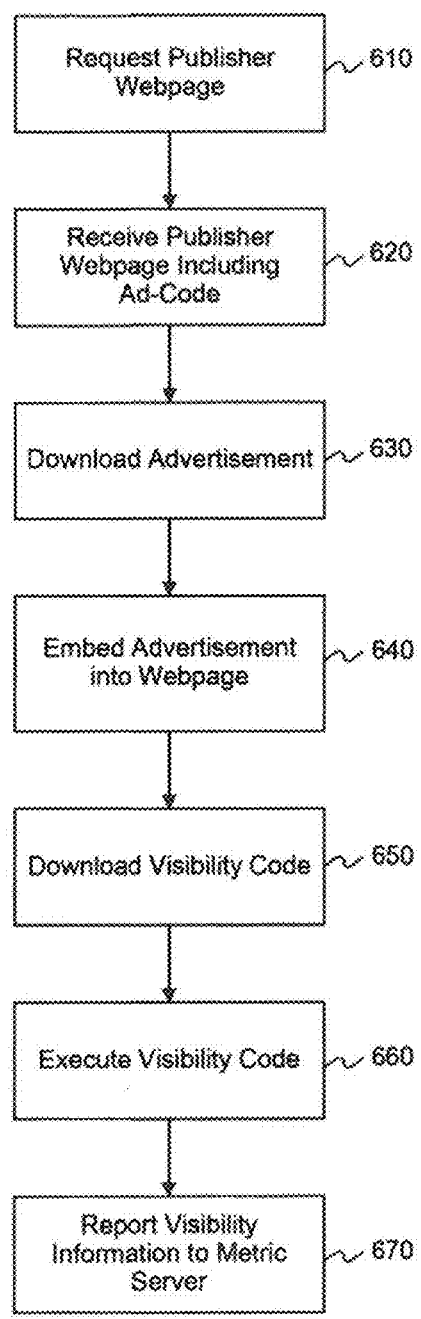
FIG. 6 is a flow diagram depicting an exemplary method of determining the visibility of an advertisement on a webpage downloaded and rendered by a browser on a client device, consistent with certain disclosed embodiments.
Figure 7:
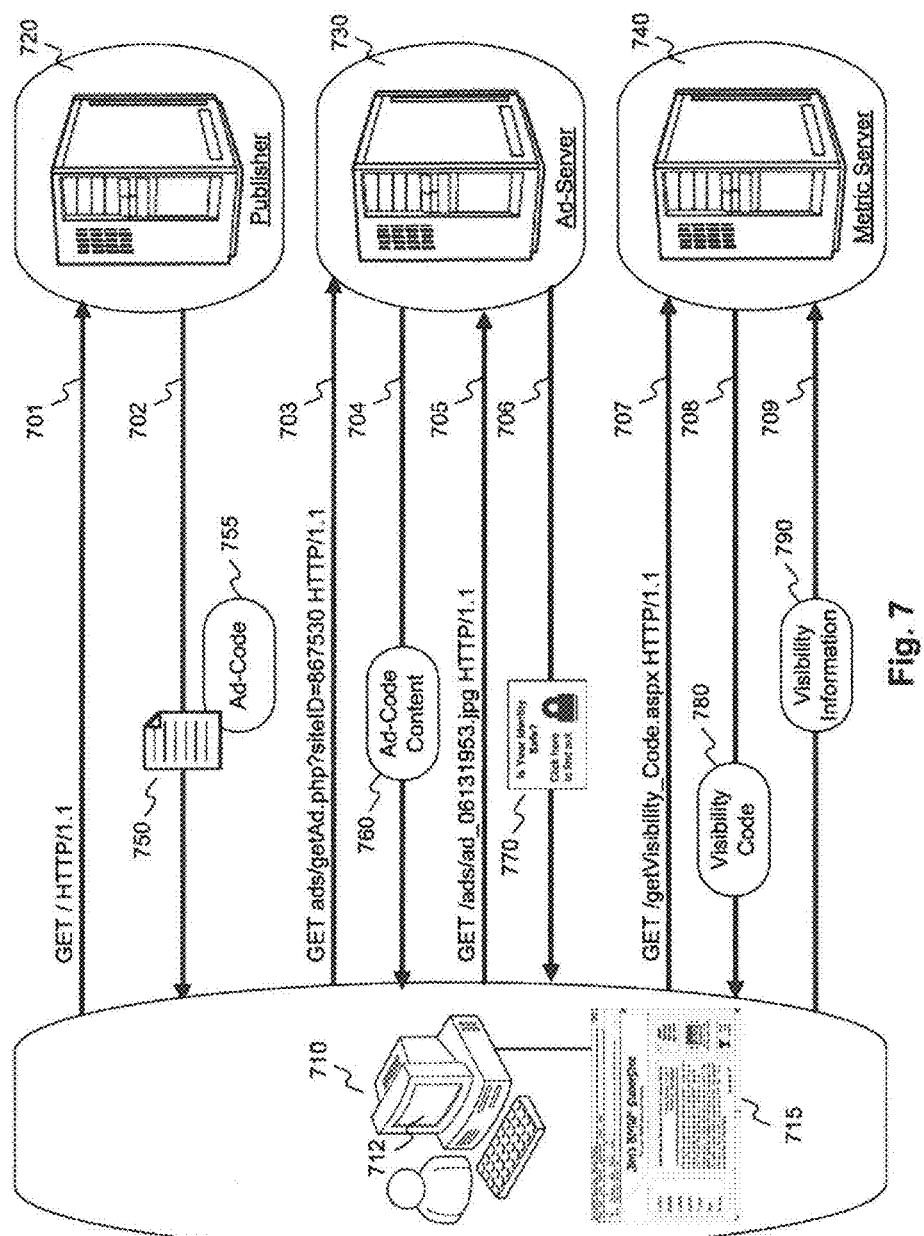
FIG. 7 is a diagram depicting an exemplary network communication sequence in which an online advertisement may be served to a client device and its visibility may be determined and reported to a metric server, consistent with certain disclosed embodiments.

FIG. 6 is a flow diagram depicting an exemplary method of determining the visibility of an advertisement on a webpage downloaded and rendered by a browser on a client device, as further illustrated by FIGS. 7 and 8, consistent with certain disclosed embodiments. FIG. 6 represents a high-level overview of an exemplary process. Subsequent figures will provide further details for various stages.

As depicted in FIG. 7, the process may begin when a client device 710 on which a browser application 715 is running sends a request 701 (e.g., an HTTP request) to a publisher server 720 for a webpage (step 610). In step 620, publisher server 720 sends a responsive message 702 (e.g., an HTTP response) that includes a webpage 750, for example in the form of an HTML file or document. In addition to content, webpage 750 may include an ad-code 755 in the form of an object or element that instructs the browser 715 to download an advertisement.

Ad-code 755 may be any kind of element or instruction that is placed within a publisher webpage that instructs a receiving browser to download an advertisement. For example, an ad-code could be a simple HTML "img" tag that points to an image file on a server that represents an advertisement. In other embodiments, in order to provide more flexibility to advertisers or third-party ad networks concerning which ad to serve to a user, an ad-code may instead instruct a browser to retrieve additional ad-code content from an external server, such as an ad-server. That additional content may then instruct the browser to retrieve an advertisement that has been dynamically selected by an ad-server.

For example, as depicted in FIG. 8 ad-code 755 may come in the form of an HTML IFrame tag 800. IFrame 800 includes a "src" attribute that instructs browser 715 to retrieve additional content from an external server—here, ad-server 730. Thus, browser 715 may send a request 703 to ad-server 730 and receive in response 704 ad-code content 760 that instructs browser 715 to retrieve a particular advertisement.

FIG. 8 depicts exemplary ad-code content 810. Here, ad-code content 810 includes a link to an advertisement in the form of an image file 812. Ad-server 730 may have dynamically selected the advertisement according to a number of different factors. In this example, image file 812 is also hosted by ad-server 730; however, in some embodiments, image file 812 may be hosted by another external server, such as an advertiser's server or a content delivery network (CDN) server specially purposed for fast serving of advertisement content.

Thus, in step 630, browser 715 downloads the advertisement from ad-server 730 by sending a separate HTTP request 705 and receiving an HTTP response 706 that includes the requested advertisement 770 (i.e., image file 812). In other cases, the advertisement may be a video file, Flash™ file, textual element, or other object. In any event, once the advertisement file has been downloaded, browser 715 may position the advertisement within the layout of the webpage downloaded from the publisher server (step 640).

As discussed above, online advertising has traditionally relied on HTTP requests to download advertisements, such as HTTP request 703 depicted in FIG. 7, to determine how many times an advertisement has been viewed. Yet, as also discussed above, this approach often may not yield accurate results, because it fails to account for advertisements that are downloaded by client devices but never displayed in browser applications or on device screens where they may actually be viewed by users.

In some embodiments, in order to overcome these and other shortcomings of conventional online advertising techniques, a client device may receive, in connection with an advertisement, a set of client-side instructions that are capable of determining whether the advertisement has in fact been displayed in a browser application or on the device screen (hereinafter, "visibility code"). The client device may receive the visibility code in a number of different ways. As depicted in FIGS. 7 and 8, in one exemplary embodiment, ad-server 730 may include a tag 814 in ad-code content 810 that instructs browser 715 to retrieve the visibility code, for example in the form of a JavaScript program, from a separate metric server 740. Thus, in step 650, browser 715 may obtain the visibility code by sending a separate HTTP request 707 and receiving an HTTP response 708 that includes the visibility code 780. Browser 715 may obtain visibility code through a number of different techniques. For example, JavaScript resident in ad-code 755 or ad-code content 810 could cause visibility code to be written directly to webpage 750—e.g., using the JavaScript document.write( ) function—which might obviate the need for browser 715 to make a separate HTTP request for the visibility code.

In step 660, browser 715 may execute the visibility code. Once the visibility code executes on the client machine and obtains visibility information regarding displayed content, in step 670, browser 715 may report the visibility information to an external device, such as a metric server 740, by HTTP communication 709, which may be a standard HTTP request, an asynchronous eXtensible Markup Language (XML) HTTP request, a secure HTTP request, etc. In some embodiments, metric server 740 may be a separate server that is dedicated to collecting advertisement visibility metrics and is operated by a third party to provide ad-visibility tracking services to publishers, advertisers, third party ad networks, ad-servers, or other entities.

FIG. 8 depicts an exemplary visibility code 820 in the form of a JavaScript program. Those skilled in the art will appreciate that exemplary visibility code 820, although depicted using JavaScript syntax, is intended for illustration purposes only. In various implementations, visibility code 820 may include additional or different expressions, function calls, or other statements for performing all of the operations necessary to implement one or more disclosed embodiments. Thus, visibility code 820 may be considered merely pseudocode for purposes of illustrating certain basic operations. Moreover, although described as having been transmitted to client device 710 from metric server 740, in other embodiments, visibility code 820 may be received from publisher server 720 (e.g., as part of ad-code 755), ad-server 730 (e.g., as part of ad code content 810), and/or any other server through various HTTP redirects, client-side script operations, nested element links, or other means. In some embodiments, visibility code, rather than being provided to a browser as a code snippet via HTTP, could be injected or inserted into the HTML of a webpage via client-side software, such as client-metering or monitoring software installed on panelist machines, or by some other type of intermediary process or entity, such as an Internet service provider or proxy server.

In some embodiments, visibility code 820 may determine whether an advertisement has been visible to a user by determining the extent to which the advertisement has been drawn on client device screen 712, within a browser viewport, and/or within a webpage data structure maintained in browser memory. These three concepts, which may be referred to as "screen-drawing," "window-drawing," and "document-drawing," respectively, will now be further described.

In some embodiments, screen-drawing may refer to operations that cause the operating system of client device 710 to draw an object on client device screen 712 by affirmatively causing various screen pixels to change color, brightness, or other aspects of appearance or physical form in order to present the object on device screen 712 for perception by a user. Thus, a screen-draw event may correspond to an object, such as an image, actually being displayed on a device screen.

Figure 4:
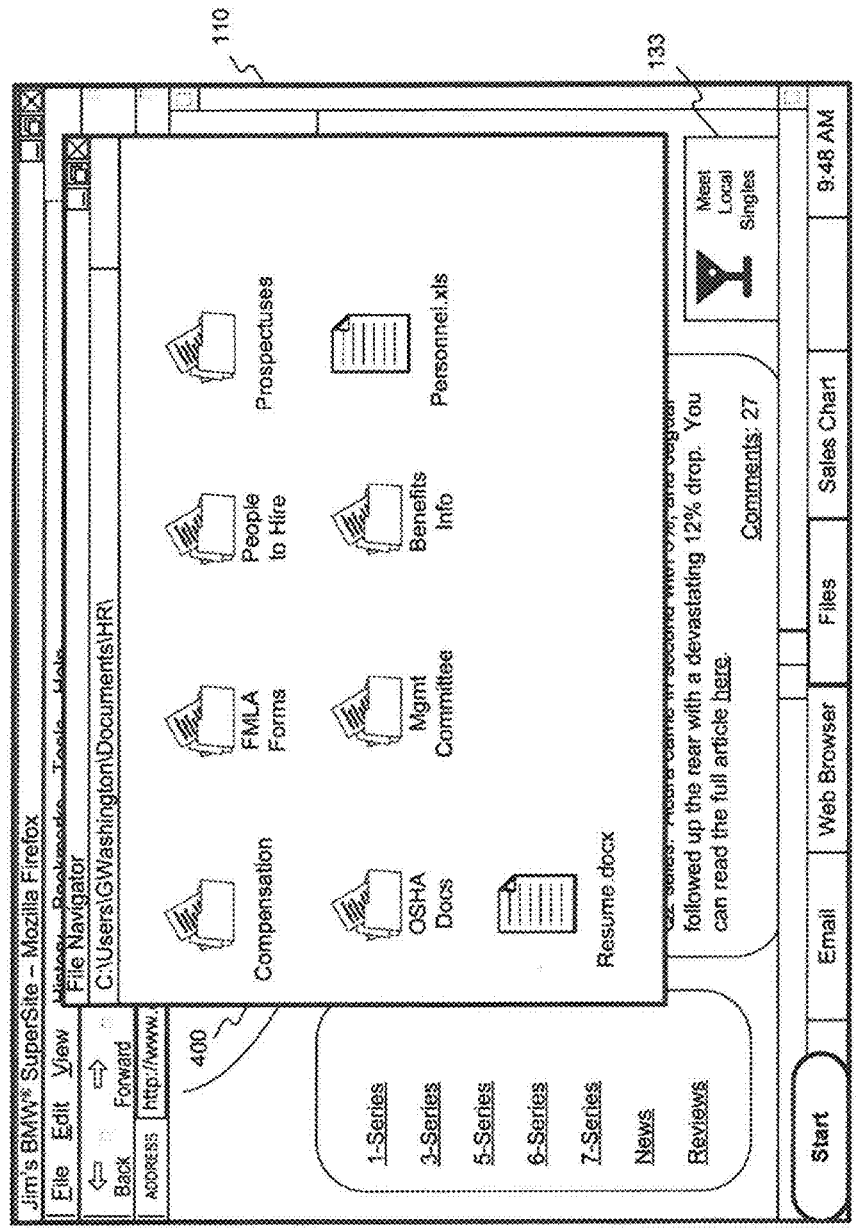
FIG. 4 is a diagram depicting an exemplary window arrangement in which a portion of a web browser viewport has been obscured by another GUI window, consistent with certain disclosed embodiments.

Because a screen-draw of an object may require actual manipulation of pixels on a display screen, any change in the appearance of the object may require a separate screen-draw operation. For example, as depicted in FIG. 1, if browser window 110 is brought to the foreground of the operating system GUI, then advertisement 131 may be displayed on the device screen by a screen-draw operation, which would involve causing the pixels in the region of advertisement 131 to graphically represent advertisement 131. However, as depicted in FIG. 4, if another window 140 is positioned over browser 110 and then subsequently removed, it may be necessary to execute another screen-draw operation in order to cause advertisement 131 to display again on the device screen. Similarly, scrolling, repositioning, resizing, or refreshing operations, etc., that affect which pixels are needed to display or re-display an object on a device screen may result in one or more screen-draw operations.

In some embodiments, in order for visibility code to determine ad-visibility through screen-draw information, it may be necessary for that visibility code to invoke certain lower-level operating system library functions or system calls on the device, either directly or through intermediate libraries. Or, it may be necessary for the visibility code to execute natively on the device.

Figure 2:
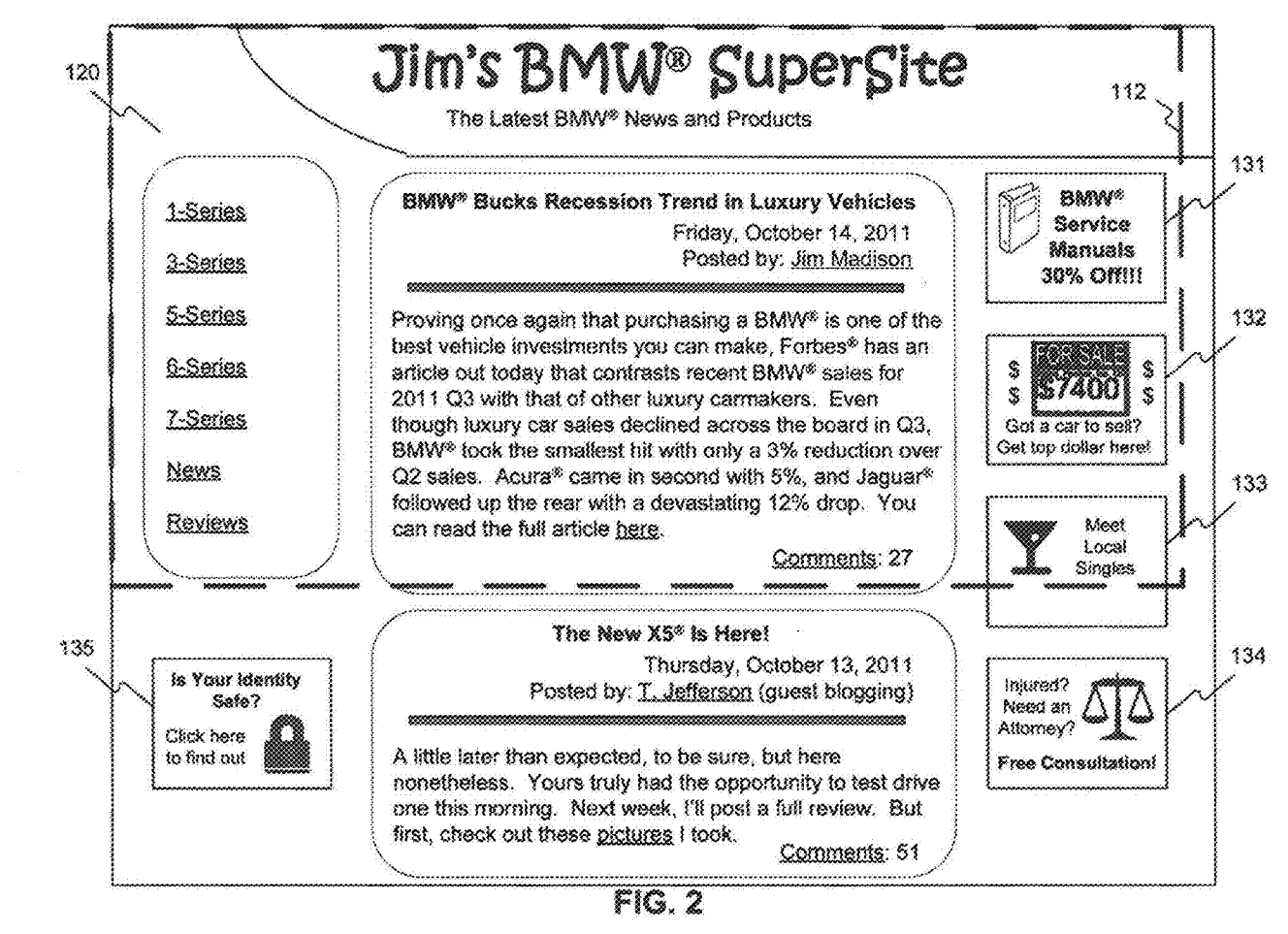

By contrast, in some embodiments, window-drawing may refer to operations that cause an object to be drawn or displayed within a particular application's GUI window without regard to, or knowledge of, whether the window-draw operation results in a screen-draw of the object. For example, as depicted in FIGS. 1 and 2, because advertisements 131-133 are within the viewport 120 of browser 110, they are rendered and displayed within the browser application window by window-draw operations. By contrast, even though advertisements 134 and 135 are part of webpage 120, such advertisements may not be drawn within the browser application window unless viewport 112 is scrolled so as to display them within the browser application.

Figure 3:
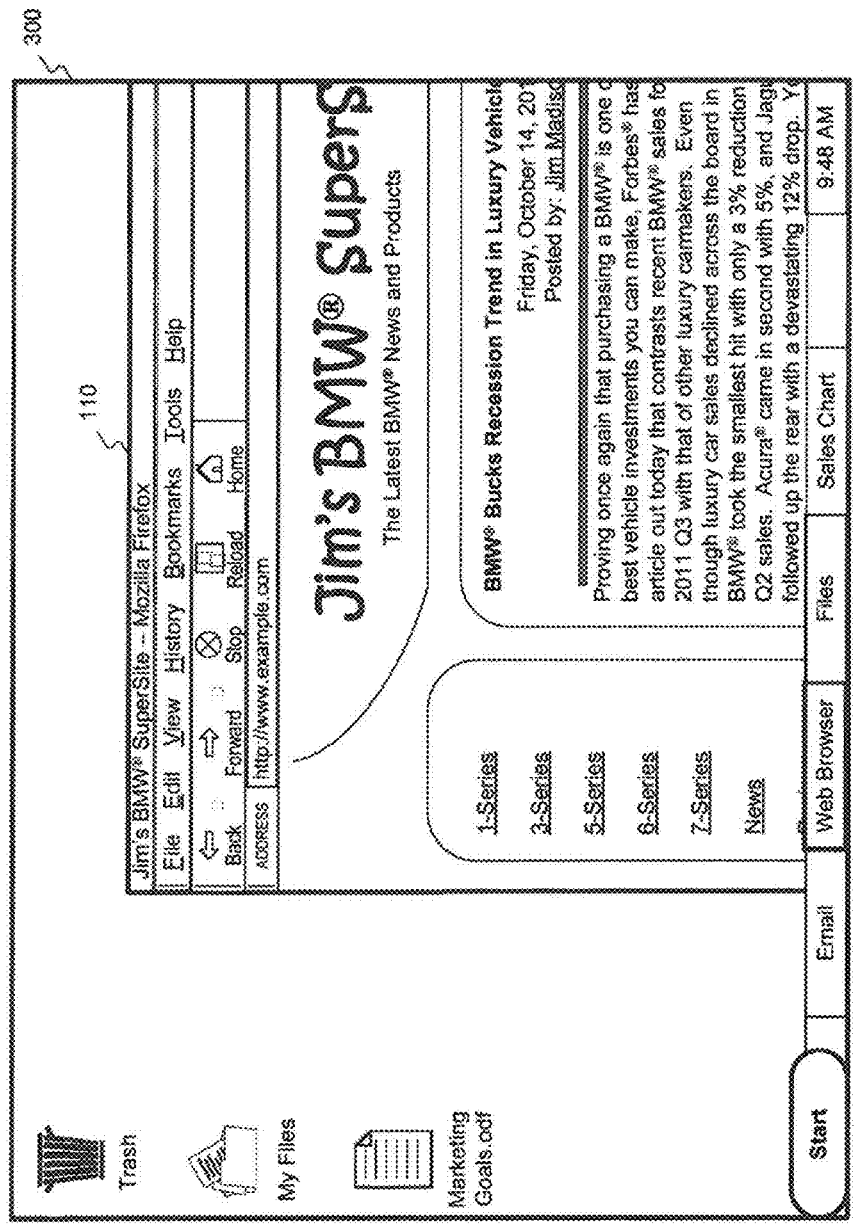
FIG. 3 is a diagram depicting an exemplary screen-clipping occurrence in which a portion of a web browser viewport has been positioned outside of the viewable screen area of a client device, consistent with certain disclosed embodiments.

In some cases, a window-draw of an object may not result in a corresponding screen-draw of the object. For example, as depicted in FIGS. 3 and 4, an object, such as an advertisement, may be drawn onto a browser viewport yet that object may not appear on the device screen if it is obscured by another window or is screen-clipped.

Finally, in some embodiments, document-drawing may refer to operations that cause an object to be added to a data structure maintained in memory that represents a document that may be displayed or rendered by the application in which the data structure is maintained. For example, most modern browsers render webpages by converting downloaded HTML text into an object or data structure in memory that represents the webpage specified by that HTML text, a data structure commonly referred to as the document object model ("DOM"). JavaScript typically operates directly on a webpage's DOM, and can add, remove, or modify elements on the webpage by invoking methods or modifying fields within the DOM.

Thus, in some embodiments, a document-draw operation may represent the operation of adding an object to a webpage by adding it to the webpage's DOM or modifying its properties within the DOM. An object that has been drawn on a webpage as part of a document-draw operation may not always result in the object being drawn within the browser window. For example, if an object is drawn on the webpage at a position that is not currently within the viewport of the browser, the effect of the document-draw operation may be only that the object has been added to the DOM (or modified within the DOM) rather than added to the currently displayed viewport as part of a window-draw operation.

For example, as depicted in FIG. 2, each of advertisements 131-135 has been downloaded and document-drawn onto webpage 120 by browser 110. Thus, in some embodiments, each of advertisements 131-135 would be accessible as objects within webpage 120's DOM. Having been drawn onto webpage 120, each of advertisements 131-135 could be visible (in this example) if a user scrolled webpage 120 displayed by browser 110 to include the advertisement within viewport 112.

To further illustrate various distinctions between screen-drawing, window-drawing, and document-drawing operations, an object could be drawn onto a webpage by JavaScript or other code that causes the object to become a part of the webpage's DOM (a document-drawing operation). Moreover, the object may undergo repeated document-draw operations, such as removing the object from the DOM and then re-adding it, re-positioning the object, re-sizing the object, etc. However, unless the object is added to the DOM (or modified within the DOM) such that it is positioned within the current browser viewport, the object may not be visible within the application and none of the document-draw operations may result in any window-draw operations within the browser application window.

If the object is positioned within the current browser viewport, then the object may be displayed in the browser application window by one or more window-draw operations. For example, if the object is repeatedly scrolled into and out of the viewport, then the object may be repeatedly window-drawn without resulting in any new document-drawing operations. However, unless the browser window occupies the foreground of the device operating system GUI and the object occupies a position in the browser window that is neither screen clipped nor obscured by another window, the object may not be visible on the device screen and none of the window-draw operations may result in any screen-draw operations within the device.

In the present disclosure, it may be determined, deduced, or inferred whether an advertisement was visible to a user by making use of, or consulting information related to, screen-drawing operations, window-drawing operations, and document-drawing operations, or combinations thereof.

For example, in some embodiments, client-side code may have access to information regarding whether an object, such as an advertisement, has been drawn on a client device screen through one or more screen-draw-count metrics. Client-side code may have access to such screen-draw information by virtue of executing natively or directly on the client device as a browser plug-in, executing within a sandbox environment, such as a Java™ Applet or Flash™ file, that provides the client-side code with access to certain lower-level system calls or operating system features, or accessing screen-draw information exposed by a browser in which the client-side code operates.

Figure 9:
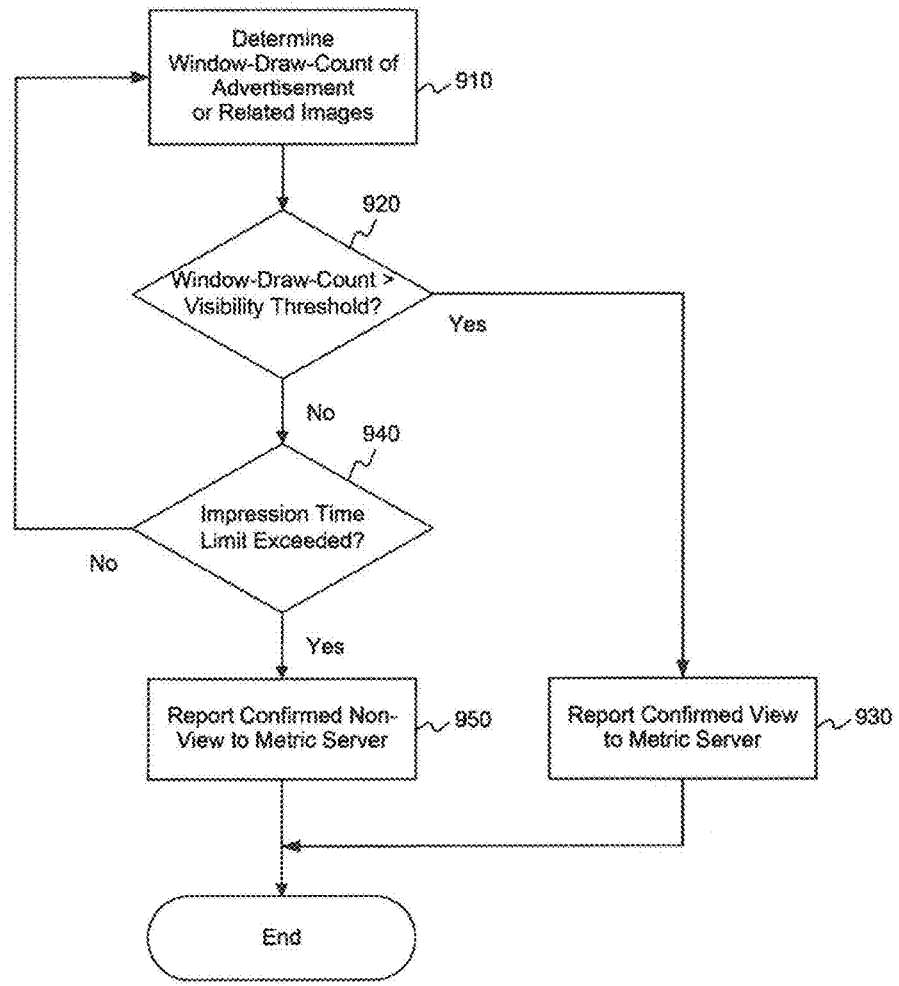
FIG. 9 is a flow diagram depicting an exemplary method of determining the visibility of an advertisement on a client device using window-draw-count information associated with one or more images, consistent with certain disclosed embodiments.

In some embodiments, if screen-draw information is not available to client-side code, it may be determined or inferred whether an advertisement was visible to a user by making use of, or consulting information related to, window-drawing operations. For example, in some browsers, the number of times that an object is drawn within the browser viewport (hereinafter, a "window-draw-count") may be recorded and made available through one or more API or client-side scripting properties, methods, or DOM attributes. In some embodiments, the window-draw-count information associated with an advertisement image or object may be used to determine the extent to which the advertisement was visible. FIG. 9 is a flow diagram that depicts an exemplary method for determining such visibility information using window-draw-counts, as performed by browser 715 when executing visibility code 820 in this example.

In step 910, browser 715 determines the window-draw-count of an advertisement or related images. For example, in visibility code 820, loop 822 periodically checks the window-draw-count of image element 812 (here, in the form of a pseudocode "window_draw_count" property provided by browser 715's DOM with respect to image elements). In some embodiments, visibility code 820 may check to make sure that image element 812 has been added to the DOM of webpage 750 and that its cascading style sheets (CSS) style has been set to visible before checking image element 812's window-draw-count. In step 920, browser 715 may evaluate whether the determined window-draw-count meets or exceeds a particular visibility threshold.

For example, in some embodiments, such as that represented in visibility code 820, the visibility threshold may be a simple binary determination as to whether the advertisement has ever been drawn within the browser's viewport. Thus, in loop 822, once the "window_draw_count" property of the "ad_06131954" object is found to be greater than zero, the advertisement may be regarded as having been visible. In other embodiments, different kinds of visibility thresholds may be employed. For example, to increase confidence that an advertisement, was visible in a browser application for a sufficient period of time or that the window-draw-count of the advertisement was not incremented merely for de minimis operations related to the browser's manner of initially rendering the webpage, a higher visibility threshold may be required before the advertisement is classified as visible. In various embodiments, other quantitative and qualitative metrics and comparisons, such as the amount of time that an advertisement has been displayed, may be used to determine whether an advertisement has met one or more visibility thresholds.

If the window-draw-count of the advertisement or related images meets the visibility threshold requirements (step 920, Yes), then, in step 930, browser 715 may report information to one or more servers indicating that the advertisement was likely visible. This information may be reported to the server using to a variety of techniques. For example, as depicted in FIGS. 7 and 8, that visibility information 790 may be reported to metric server 740 as an asynchronous XML HTTP request 709 (see instruction 824). In other embodiments, visibility code 820 may instruct browser 715 to report such information using other means, such as by providing links to a transparent pixel image (also known as a "web beacon") hosted by metric server 740. In FIG. 7, metric server 740 is depicted as a separate server. In various embodiments, however, metric server 740 may also be identical to publisher server 720 or ad-server 730. Metric server 740 may also be operated by the advertiser associated with the advertisement for which visibility information is being determined.

In some embodiments, a browser may report visibility information for an advertisement only if it has been determined that the advertisement has been drawn, or drawn a sufficient number of times, in the browser's viewport (a "confirmed view"), whereas no information may be reported for an advertisement that has not been confirmed as viewed. In other embodiments, a browser may report not only confirmed views, but also when it determines that the advertisement has not been viewed or when it determines that the advertisement was viewed less than a certain number of times within a certain timeframe (a "confirmed non-view").

In some embodiments, the ad-code may set a time limit during which the requisite degree of visibility must be determined in order to qualify as a view. For example, an advertiser may require that an advertisement must be viewed within a specified time after a webpage is downloaded or rendered by a browser in order to credit the publisher with a view commission. Other advertisers may require that an advertisement be visible within a specified time after the occurrence of some other event, such as, for example, after an object is downloaded or added to the DOM, after a viewport is in focus, or after a particular animation finishes playing.

Thus, in step 940, browser 715 may determine whether an impression time limit, representing a particular time frame during which the advertisement must be viewed, has been exceeded. If the impression time limit has not been exceeded (step 940, No), then browser 715 may return to step 910 and continue to periodically check the window-draw-count of the advertisement until the impression time limit expires. For example, loop 822 is coded to examine the "window_draw_count" property of image element 812 every 100 milliseconds for a total impression time limit of 30000 milliseconds (i.e., 30 seconds). After 30000 milliseconds have elapsed, visibility code 820 no longer examines the window-draw-count and, if the requisite degree of visibility is not achieved, the advertisement may be regarded as a confirmed non-view. In other embodiments, an impression time limit may not be imposed, and a browser may simply report the visibility information to the metric server once a confirmed view occurs, regardless of the time that has elapsed since the webpage was originally downloaded or rendered.

If the impression time limit expires before there is a confirmed view (step 940, Yes) or a confirmed non-view is otherwise determined, then browser 715 may report the confirmed non-view to one or more metric servers 740 or may report metrics associated with the confirmed non-view (step 950). For example instruction 826 may cause browser 715 to send an asynchronous XML HTTP request 709 reporting the confirmed non-view and/or metrics associated with the confirmed non-view. In other embodiments, once the impression time limit expires, processing may terminate and nothing may be reported to metric server 740. In some embodiments, metric server 740 may have access to information about what advertisements were served by ad-server 730 and may infer the non-view if browser 715 does not report a confirmed view within a specified period of time after the advertisement was served to browser 715.

In one embodiment, metric server 740 may use information about confirmed views, confirmed non-views, and inferred non-views to determine visibility statistics for the advertisement across one or more publishers, to determine statistics concerning the publisher's success in displaying one or more advertisements in a visible manner (e.g., to detect potential fraudulent behavior), to determine respective visibility statistics across different advertisements or ad-code formats, etc. Those skilled in the art will appreciate that foregoing examples of information that may be determined by metric server 740 are exemplary only.

In addition to, or instead of, browser 715 reporting conclusions to metric server 740 in the form of confirmed views and/or confirmed non-views, in some embodiments, browser 715 may simply report various metrics that it has gathered concerning the visibility of one or more advertisements. These metrics may include information describing how much of the advertisement was visible, as well as the time period during which the advertisement was fully or partially visible. Such metrics may also include the total window-draw-count of a particular advertisement, the total window-draw-count of the advertisement within a particular window of time (i.e., window-draw-frequency), how the window-draw-count compares with window-draw-counts of other elements in the webpage or with historical metrics for advertisements on the webpage or similar webpages, etc. Those skilled in the art will appreciate that the foregoing exemplary window-draw-count metrics are exemplary only, and that other valuable window-draw-count metrics may be obtained by consulting window-draw-count properties associated with one or more webpage elements.

By receiving visibility metrics from browser 715, rather than visibility conclusions such as confirmed views or confirmed non-views, metric server 740 may employ algorithms to derive its own visibility conclusions for individual advertisements based on rules specific to particular advertisements, advertisers, or ad campaigns, or specific to particular client environments, such as device type, operating system, browser, etc. Using this approach, metric server 740 or advertisers may also be able to dynamically modify rules concerning what kind of metrics are necessary to qualify as confirmed view or a confirmed non-view for a particular advertisement without having to change the logic present in visibility code 820. Also, by hiding the details concerning what kind of metrics will qualify as a confirmed view (e.g., by not including confirmed view determining code in visibility code 820), publishers may be deterred or prevented from modifying any client-side code to create fraudulent confirmed view counts.

In some embodiments, rather than consulting window-draw-count information associated with an actual advertisement, the window-thaw-counts of one or more related images may be consulted. For example, as depicted in FIG. 10, a transparent reference image 1010 may be positioned over an advertisement 135. In FIG. 10, to distinguish between elements, transparent image 1010 is depicted at a slight offset from image 135; however, in various embodiments, the two may occupy the same position and have identical dimensions. In some embodiments, in a manner similar to that described in connection with FIGS. 8 and 9, browser 715 may determine the visibility of advertisement 135 by consulting window-draw-count information associated with transparent image 1010. This technique may be used, for example, when advertisement 135 is encoded not as an image file, but as text, video, Flash™, or other type of object for which browser 715 does not provide or expose a window-draw-count property.

Moreover, by consulting window-draw-counts of one or more reference images related to the advertisement, rather than those of the advertisement itself, a variety of richer visibility metrics may be obtained. For example, as can be seen in FIG. 2, although viewport 112 includes advertisement 133, only a portion of the advertisement would be visible on a device screen in the current viewport configuration. Some browsers may increment an object's window-draw-count property any time that any portion of the object is drawn within the browser viewport, even if only a trivial portion has been displayed.

Moreover, even if an advertisement is included within a visible browser viewport, the advertisement may nevertheless be only partially visible if an HTML element within which the advertisement is contained (e.g., an IFrame) has dimensions smaller than the advertisement itself. Thus, additional mechanisms may be needed to ensure not only that a downloaded advertisement has been made visible in a browser viewport, but that it has also been made visible in its entirety or to a sufficient extent to qualify as a confirmed view.

In one exemplary embodiment, a plurality of reference objects, such as images, may be placed at positions having known relations to the position and dimensions of an advertisement. The window-thaw-counts of the reference images may then be consulted and used to infer information about the visibility of the advertisement, based on the known relations. For example, as depicted in FIG. 11, a series of transparent'1×1 pixel images 1110*a*-1110*d* (enlarged for purposes of illustration), may be positioned such that one transparent pixel image is placed at or overlapping each corner of an advertisement 1133. Using this arrangement, when a top portion of advertisement 133 is displayed in the browser viewport, the window-draw-counts of reference images 1110*a* and 1110*b* will be incremented. Similarly, when a bottom portion of advertisement 133 is displayed in the browser viewport, the window-draw-counts of reference images 1110*c* and 1110*d* will be incremented.

Thus, for example, in the case of FIG. 2, because only the top portion of advertisement 133 is included within viewport 112, only reference images 1110*a* and 1110*b* may have non-zero window-draw-counts. From that information, it may be determined that some portion of the bottom of advertisement 133 was not visible. Similarly, if only reference images 1110*a* and 1110*c* had non-zero window-draw-counts, then it may be determined that some portion of the right side of advertisement 133 was not visible. Or, if only three reference images had non-zero window-draw-counts, then it might be determined that some portion of the corner of the advertisement was not visible.

In some embodiments, information about the extent to which an advertisement has been visible may be enhanced by placing a series of reference images, such as transparent pixel images, throughout the area in which an advertisement is drawn on a webpage or along the perimeter of the advertisement. Window-draw-counts of the reference images may then be consulted to infer how much of the advertisement has been visible based on potentially differing window-draw-counts of the reference images. For example, as depicted in FIG. 12, a series of transparent pixel images $1210a_0$ though $1210e_4$ (enlarged for purposes of illustration) are arranged in a grid-like fashion over the dimensions of advertisement 133.

Using this arrangement, the partial display of advertisement 133 in FIG. 2 might result in only reference images $1210a_0$ through $1210e_2$ having non-zero window-draw-counts. From this information, it may be determined that at most 60% of advertisement 133 can be confirmed as having been visible on a browser viewport. In other embodiments, an even more granular reference image grid may be used, enabling an even more precise visibility percentage to be determined. For example, by using a grid-like arrangement, rich information about potentially different visibility scenarios may be detected, such as partial clipping in the center of advertisement 133 or one or more thin strips obscuring a cross section of advertisement 133.

Those skilled in the art will appreciate that there may be other arrangements, shapes, or sizes of reference objects that may be placed on, around, or outside of an advertisement whose window-draw-counts may be consulted to infer the extent to which the advertisement itself was visible in a browser viewport, within the scope of the invention. Moreover, although described in the context of reference images, such as transparent pixel images, other webpage elements— such as text, vectors, etc.—may be used as reference objects instead of images if window-draw-count properties are exposed for those elements. Although not depicted in pseudocode form, those skilled in the art will appreciate that the embodiments described with respect to FIGS. 10-12 may also be implemented by visibility code 820 or other client-side code transmitted to and executed by browser 715, within the scope of the present disclosure.

In some embodiments, a browser may determine whether an advertisement should be reported as a confirmed view based on the extent to which it was visible. For example, visibility code 820 could instruct browser 715 to report confirmed views only for advertisements that were displayed at 90% or more in a browser viewport, or for which at least the top 70% was displayed, etc. In other embodiments, visibility code 820 could instruct browser 715 to report all determined visibility metrics for the advertisement in order to permit metric server 740 to make its own visibility conclusions based on the received visibility metrics. In still other embodiments, either browser 715 (e.g., pursuant to visibility code 820) or metric server 740 could determine a confidence level reflecting a degree of confidence, numerical or otherwise, associated with a visibility conclusion, based on the determined visibility metrics.

Although the foregoing embodiments have been described with respect to determining window-draw-counts of elements in webpage 750, they are also applicable to screen-draw-counts. For example, if the client-side code has access to operating system information that indicates whether or how many times an object has been drawn on a client device screen, or if such information is exposed by a browser API, then any of the above techniques may be used to determine the visibility of an advertisement based on screen-draw-counts.

In some cases, a particular browser may not provide or expose screen-draw-count or window-draw-count properties for webpage elements. For those cases, the present disclosure also includes techniques for inferring whether an advertisement has been visible in a browser viewport or on a device screen by comparing document-draw-counts of reference objects associated with the advertisement with reference objects that are guaranteed or likely not to be visible. Exemplary embodiments directed to this technique are depicted in FIGS. 13 and 14, which make reference to the exemplary webpage of FIGS. 1 and 2.

Figure 13:
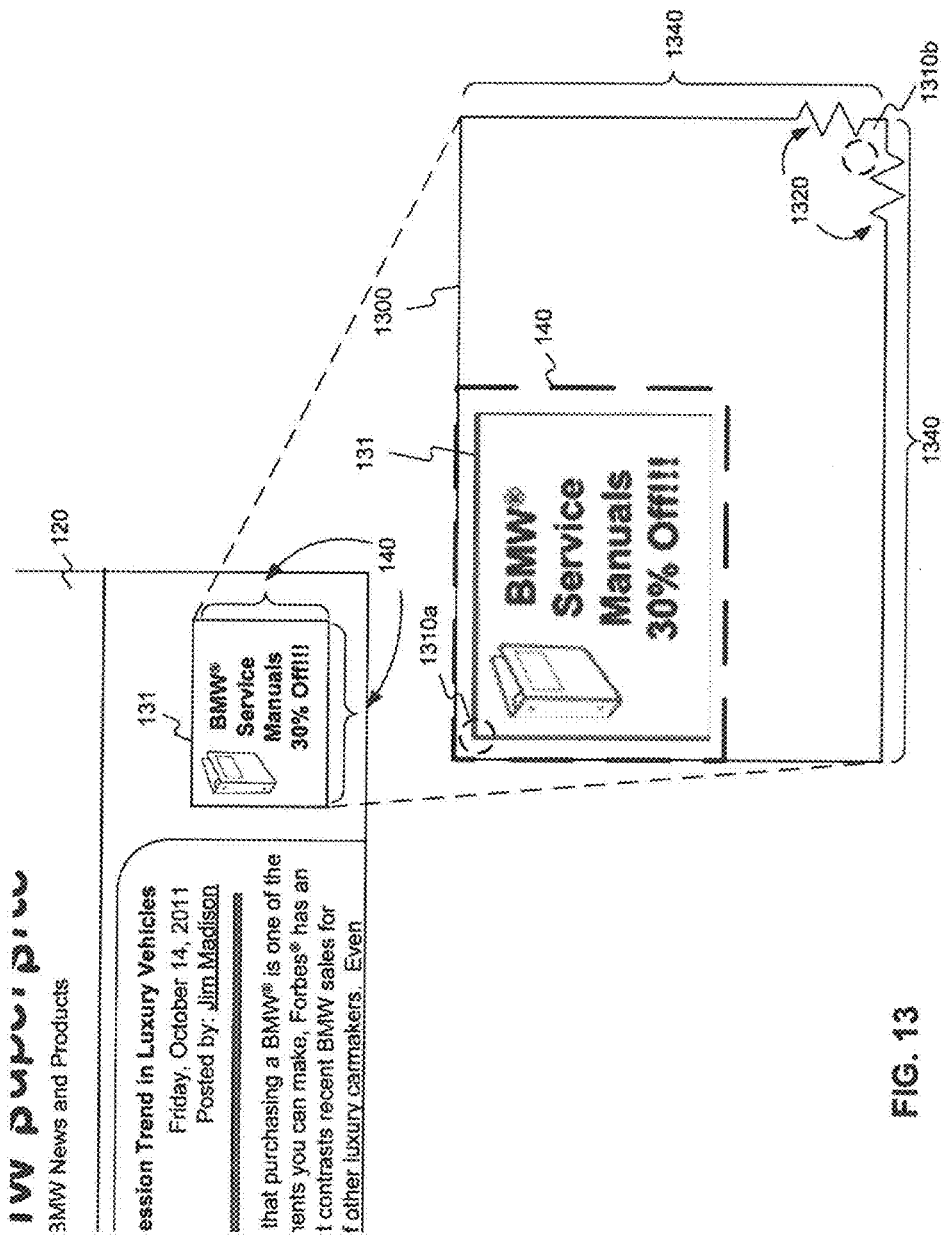
FIG. 13 is a diagram depicting an exemplary technique for placing one or more reference images in an area that is guaranteed or likely to be non-visible, consistent with certain disclosed embodiments.
Figure 14:
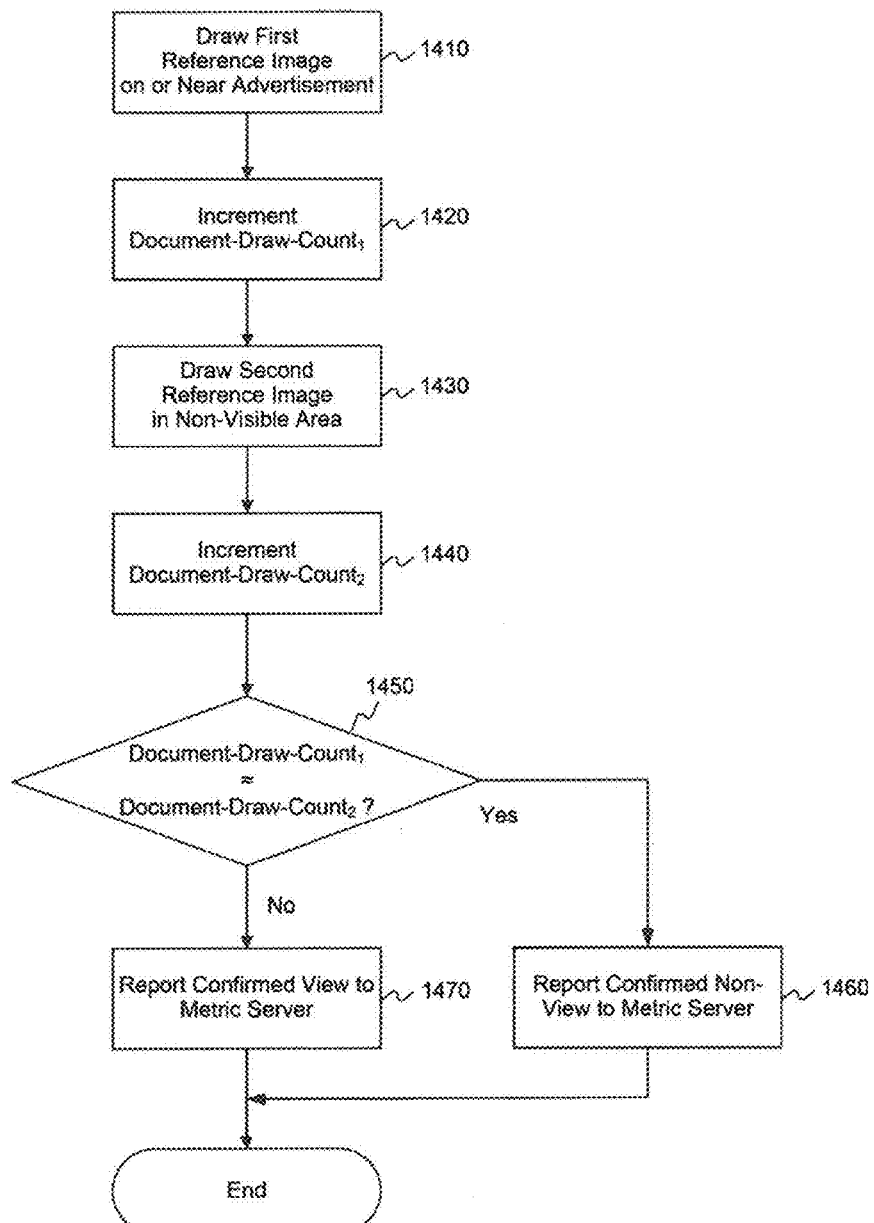
FIG. 14 is a flow diagram depicting an exemplary method of comparing the relative document-draw-counts of two or more reference images to measure the visibility of an advertisement, consistent with certain disclosed embodiments.

FIG. 13 depicts an excerpt of an exemplary webpage 120, including advertisement 131. Although advertisement 131 may be confined to dimensions 140 within webpage 120, advertisement 131 may be placed within a container, such as IFrame 1300 (magnified for purposes of illustration), that has much larger dimensions 1340—for example, 10000 pixels by 10000 pixels. Here, jagged lines 1320 are meant to indicate that dimensions 1340 are not drawn to scale and that the bottom right corner of IFrame 1300 may be thousands of pixels removed from the other portion of IFrame 1300 that is depicted.

Despite spanning potentially thousands of pixels 1340, the display of IFrame 1300 may be confined to the dimensions 140 of the advertisement 131 when incorporated into webpage 120 by layout instructions provided by IFrame 1300, an ad-code containing IFrame 1300, or another element or container within webpage 120. If, in addition to confining IFrame 1300 to dimensions 140, such layout instructions further hide or remove any scrollbars that would otherwise allow a user to scroll through different portions of IFrame 1300 within area 140, then any portions of IFrame 1300 not included within area 140 may never be visible within the viewport of the browser.

In this manner an area within IFrame 1300 may be established that is guaranteed or likely to never be visible (e.g., any portion of IFrame 1300 that is outside of area 140). Document-draw-counts associated with a reference object on or near an advertisement 131 within IFrame 1300 may be compared to document-draw-counts associated with a reference object that is likely to never be visible. To the extent that the document-draw-counts of both reference images are similar or dissimilar, it may be inferred whether the advertisement itself was ever visible. Exemplary steps that may be involved in this embodiment are depicted in FIG. 14 and, in some embodiments, may be performed within a particular limited time period or impression window.

For example, in step 1410, browser 715 (e.g., pursuant to client-side visibility code provided by one or more servers 710-730) may attempt to draw a first reference image onto the webpage and within the area occupied by the advertisement or near the advertisement. As described above, visibility code may draw an object onto a webpage by adding it to the browser's DOM representing the webpage or modifying the object's DOM properties, an operation that may be referred to as a document-draw. Thus, in some embodiments, the document-draw operation of step 1410 may refer not to an instruction to draw the image on a device screen or a browser viewport (which browser 715 may not allow client-side code to perform) but to an instruction to the browser to draw the image on the webpage, as described above. For example, the JavaScript "drawImage( )" function will allow a client-side script to attempt to add an image to a webpage at specified X and Y coordinates on the webpage in which the script resides.

As depicted in FIG. 13, a first reference image 1310a (such as a transparent pixel image) may be attempted to be drawn over advertisement 131 within a given time period. If this document-draw operation is successful, in step 1420, the browser may increment a document-draw-count associated with the first reference image, which may be a simple integer or other data structure maintained by the client-side code that counts the number of times a document-draw operation has been performed for a particular object. In step 1430, the browser may attempt to place a second reference image in an area that is guaranteed or likely to be non-visible, such as reference image 1310b, which may be drawn at a (10000-pixel, 10000-pixel) X-Y position in IFrame 1300 (or, in some embodiments, in a negative-coordinate position, such as −1 and −1). If this document-draw operation is successful, in step 1440, the browser may increment the document-draw-count associated with the second reference image (e.g., by incrementing a second integer or data structure).

After the browser has attempted to draw both the first and second reference images one or more times, the browser may compare their respective document-draw-counts (step 1450). If the values of the first and second document-draw-counts match (step 1450, Yes), either exactly or within a specified threshold of each other, then, in some embodiments, it may be deduced that the first reference image, like the second reference image, was never visible during the time period. Accordingly, because the first reference image is located on or near the advertisement, it may be deduced that the advertisement was also never visible. Therefore, in step 1460, the browser may report the confirmed non-view to one or more metric servers.

If, however, the values of the document-draw-counts differ (step 1450, No) by some pre-determined threshold, then, in some embodiments, it may be assumed that the first reference image was likely visible at some point, because otherwise its document-draw-count might more closely match that of the non-visible second reference image. Accordingly, because the first reference image is located on or near the advertisement, it may be assumed that the advertisement was also visible at some point. Therefore, in step 1470, the browser may report the confirmed view to one or more metric servers.

Those skilled in the art will appreciate that the steps depicted in FIG. 14 are presented in a concise, simplified manner for the purpose of illustrating that the visibility of an advertisement may be inferred by comparing the document-draw-count of a first reference object that may or may not be visible to the document-draw-count of a second reference object that is guaranteed or likely to never be visible. In various embodiments, the precise nature by which the drawing operations of steps 1410 and 1430 are performed and the comparison of step 1450 is made may vary according to the peculiar characteristics of the browser in which the method is performed or according to the type of information that is sought.

For example, in some browsers, if a client-side script attempts to draw an image in an area of the webpage that is not yet in the viewport, the browser may ignore the document-draw instruction in order to conserve resources. In other browsers, the document-draw instruction may fail for other reasons. If the client-side script is able to determine that the draw operation for a reference image has failed (e.g., by instructing the browser to draw the reference image and then determining that the reference image cannot be located within the DOM), then the client-side script may refrain from incrementing its document-draw-count for that reference image. In some embodiments, the client-side script may only execute the document-draw-count incrementing operation if the draw instruction does not throw an exception, throw an error, or otherwise fail.

For embodiments under this approach, the client-side script may determine whether a reference image was ever visible by determining whether it has recorded a non-zero document-draw-count for the reference object. In other embodiments, it may be assumed that a drawing operation for an image in a non-visible location would fail more frequently than a drawing operation for an image in a visible location. In that case, the client-side script may attempt to draw both the first reference image and the second reference image a specified number of times, and may thereafter compare the document-draw-counts associated with each. Thus, in some embodiments, it may be determined that an advertisement was likely visible if the document-draw-count associated with the first reference image is greater than the document-draw-count associated with the second reference image.

By contrast, some browsers may treat instructions by client-side code to draw images in visible and non-visible locations alike, in which case failure or success rates may not be an appropriate proxy. In some embodiments, for these browsers, the client-side script may attempt to redraw both the first and second reference images multiple times and may compare the frequency with which the reference images were redrawn in order to infer visibility information. For example, in some browsers, an instruction to draw an image in a non-visible area of the webpage may execute more quickly than an instruction to draw an image in a visible area of the webpage. This time difference may be explained by the fact that a document-draw instruction for an image within a visible area of the webpage may require an actual window-draw operation in a browser viewport or an actual screen-draw operation on a device screen, whereas a document-draw instruction for an image that is not within a visible area of the webpage may not require any actual screen-drawing operations, window-drawing operations, or other system calls.

This time difference may be exploited to determine whether two reference images have the same document-draw frequency. For example, browser 715 may attempt to draw (or redraw) sample image 1310a specified number of times (e.g., 100 times) on webpage 120 and may attempt to draw (or redraw) sample image 1310b the same number of times on webpage 120: After both sets of drawing attempts, browser 715 may compare the total time taken to draw each sample image set. If the time taken to perform the redraws for sample image 1310a is equal to, or within a predetermined threshold of, the time taken to perform the redraws for sample image 1310b, then it may be concluded that reference image 1310a, like reference image 1310b, was likely not visible on a device screen during the time period in which the respect document-draw-counts were analyzed. Accordingly, it may therefore be deduced that advertisement 131 was also not visible during that time period.

If, however, the time taken to perform the redraws for reference image 1310a is significantly greater than the time taken to perform the redraws for reference image 1310b, then it may be concluded that reference image 1310a, unlike reference image 1310b, was likely visible. Accordingly, it may therefore be deduced that advertisement 131 was also visible at some point on a device screen. In some embodiments, rather than attempting to perform the redraws for reference image 1310*a* and reference image 1310*b* sequentially, a browser may alternate between repeating sets of redraw requests for both reference images in an interleaved manner to reduce the likelihood that a temporary slow-down in browser processing might account for total time differences.

In some embodiments, a browser may attempt to repeatedly redraw reference image 1310*a* on webpage 120 for a particular limited period of time and to attempt to repeatedly redraw reference image 1310*b* on webpage 120 for the same period of time. During this time period, client-side code may maintain document-draw-counts for the redraw operations of the respective reference images. Afterward, the total number of redraws for reference image 1310*a* may be compared to the total number of redraws for reference image 1310*b*. Thus, in some embodiments, it may be determined that an advertisement was likely visible on a device screen if the document-draw-count associated with the first reference image is less than the document-draw-count associated with the second reference image.

As described above, reference images need not be actual images, but can be any kind of webpage elements for which document-draw operations can be performed and document-draw-count information maintained. In some embodiments, rather than attempting to draw different reference images at different locations within IFrame 1300, the same reference image may simply be attempted to be drawn at multiple locations. Nor is it necessary that reference images be explicitly redrawn in order to compare document-draw-count timings or frequencies. In other embodiments, a reference image may instead be resized, moved, or otherwise manipulated in a manner that would require the browser to redraw the reference image within the viewport if the object were visible within the viewport.

Other embodiments may employ other techniques to determine whether an advertisement was likely visible on a device screen based on similarities or differences between document-draw-counts of different reference images in an IFrame or other container. Moreover, most or all of the variations described with respect to FIGS. 9-12 may also be applied to the embodiments described with respect to FIGS. 13 and 14. For example, as depicted in FIGS. 11 and 12, a plurality of reference images may be positioned on or near an advertisement. If some of the reference images positioned on or near the advertisement have document-draw-counts similar to that of a reference image that is guaranteed or likely to be non-visible while other reference images positioned on or near the advertisement have document-draw-counts dissimilar to the non-visible reference image, then it may be determined that only a portion of the advertisement was visible.

Similarly, a determination or confidence level as to the visibility of an object may be made locally within the browser, or various metrics may be transmitted to one or more metric servers, where such determinations may be made remotely. Moreover, in any embodiment described in the present disclosure, rather than transmitting such information to an external server, the information may be made available to other scripts executing in the browser or to other processes executing, on the same device.

In other embodiments, browser 715 (e.g., pursuant to client-side code provided by one or more servers 710-730) may determine whether an advertisement contained within an IFrame was likely visible by inferring the location of an IFrame containing the advertisement within an application window or within the device screen. For example, using the "mozInnerScreenX" and "mozInnerScreenY" properties provided by Mozilla browsers, the X and Y coordinates of the top-left corner of an IFrame may be determined in terms of screen coordinates. By coupling these X-Y screen coordinates with known or deduced information about the dimensions of a user desktop or device screen, it may be inferred whether the IFrame is located outside of the dimensions of the desktop or device screen, in which case the advertisement within the IFrame would also likely be non-visible.

In some embodiments, if information regarding the size and position of the browser viewport is not known, the X-Y screen coordinates and dimensions of an advertisement or an IFrame containing an advertisement may still be used to infer visibility of that advertisement. For example, information regarding the average location and dimensions of browser viewports across different standard desktop resolutions can be compiled by analyzing viewport and desktop dimensions across a group of client machines, such as client machines of participants in a research panel. For example, analysis of research panel client machines may indicate that for desktop resolutions of 1024×768 pixels, the average browser viewport in the research panel was located at screen coordinates (100, 100) with dimensions of 800×600. If information regarding the dimensions of the desktop of the client device displaying the advertisement is known, that information may be compared with the average viewport location and dimension information from the research panel to determine the most likely size and dimensions of the browser viewport in the client device. This information may then be compared with the X-Y coordinates and dimensions of the advertisement or its associated IFrame to determine whether the advertisement would be located within the average browser viewport area determined from the research panel. If so, then an inference can be made that the advertisement was, visible. In some embodiments, a confidence level associated with the visibility determination for the advertisement may be adjusted to account for the approximation required in such an analysis.

In other embodiments, information regarding the average toolbar and scroll bar area in a browser viewport can be used when determining visibility of an advertisement within the browser viewport. For example, information regarding the average size and dimensions of toolbars in different types of browsers can be compiled by analyzing information regarding toolbar size and dimensions from client machines, such as client machines participating in a research panel. Alternatively, or in addition, information regarding the average size and location of browser viewport scroll bars can also be compiled by analyzing such information from client machines, such as client machines participating in a research panel. This information can then be compiled to generate a list of average toolbar and/or scroll bar sizes and locations for various types of browsers. Accordingly, in some embodiments, if it is determined that a measured advertisement is located within an area of the screen within which an average toolbar and/or scroll bar could be displayed, an adjustment can be made to the visibility information regarding that advertisement. For example, in some embodiments, the advertisement may be considered partially visible or fully non-visible depending on the amount of overlap between the advertisement and the average toolbar and/or scroll bar. In some embodiments, a confidence level associated with the visibility determination may be adjusted to account for the approximation required in this analysis.

In still other embodiments, an advertisement may be placed within an IFrame 1300 having a source attribute that is of the same, domain as the parent webpage (also known as a "friendly IFrame"). In some browsers, friendly IFrames are granted access to information about DOM properties of a parent webpage that are not granted to IFrames having differing domains (also known as "non-friendly IFrames"). Using information exposed by the parent webpage DOM, client-side code within a friendly IFrame may determine whether an advertisement within the friendly IFrame was likely visible.

For example, client-side code may first attempt to access DOM information about the parent webpage that would be available only to friendly IFrames. If that information is accessible, then it may be inferred that the IFrame is friendly and further DOM information about the parent webpage and/or browser may be accessed. The client-side code may first determine the X-Y positions of various elements, such as an advertisement or reference objects related to the advertisement, within the browser's viewport. Next, the client-side code may determine the size of the viewport by consulting DOM attributes such as the inner width and inner height of the browser. The client-side code may also consult DOM attributes to determine the size of advertisement or the size or layout of the reference objects. Then, based on the foregoing positional and dimensional information, it may be determined whether the advertisement is fully displayed within, partially displayed within, or fully outside of the browser viewport.

In some embodiments, if an advertisement is placed within a non-friendly IFrame, then it may nevertheless obtain access to the DOM information of the parent webpage if it is nested within a friendly IFrame. For example, the friendly IFrame may be coded to directly access information about the parent webpage provided by the parent webpage DOM and to make such information available to the non-friendly IFrame that is nested within it. In some cases, such information may be passed down through a plurality of non-friendly IFrames that are nested sequentially in a friendly IFrame. Alternatively, absent a nesting relationship, a friendly IFrame may provide parent webpage DOM information to a non-friendly sibling IFrame.

In still other embodiments, client-side code in an IFrame may monitor mouse positions—for example, by monitoring mouse events, such as mouse clicks or mouse movements, that provide mouse position information—to infer the location of the IFrame within the parent webpage or the device screen. For example, the client-side code may examine the X-Y coordinates of one or more mouse pointer positions. If the IFrame is non-friendly, then X-Y coordinate info made available to the IFrame may refer only to X-Y coordinates of the mouse pointer with respect to the IFrame (e.g., assuming a 0-0 origin for the top-left corner of the IFrame), and not to the coordinates of the mouse pointer with respect to the parent webpage or the device screen. Nevertheless, by coupling the provided X-Y coordinates with known or assumed information about the dimensions, of a user desktop or device screen, it may be inferred whether an IFrame is located outside of the dimensions of the desktop.

For example, if the provided X-Y coordinates of the mouse pointer are 320 and −27800, respectively, then it can be known that the mouse pointer is located at a Y position that is 27800 pixels above the top-left corner of the IFrame. If it is assumed that most screens, desktops, or viewports do not span 27800 pixels vertically, then it may be assumed that the IFrame was likely in a non-visible area of the webpage when the mouse position was captured. If, after analyzing a certain number of mouse pointer positions, all or most of the analyzed mouse pointer positions suggest that the IFrame was not visible when the mouse pointer positions were measured, then it may be inferred that the advertisement was not visible during the timeframe in which mouse pointer positions were measured. This technique may also be applied to other user or browser actions to which events having coordinate information may be attached. For example, similar techniques may be applied by analyzing touch or gesture positions in devices having touchscreens or other peripheral devices by which users may manipulate GUI displays through physical movements.

Similarly, one or more event listeners—such as the JavaScript "on MouseOver" and "orMouseOut" listeners—may be attached to an advertisement object, or reference objects related thereto, to detect whether a mouse cursor or pointer has moved over or off of the advertisement object or reference objects. If either event is detected, that information may be used to determine visibility.

In still other embodiments, other properties exposed by the browser API, browser DOM, application API, or device API may be used to infer or help infer whether an advertisement was visible. Such properties include, without limitation, information concerning whether a particular browser tab containing the parent webpage of the advertisement has been visible or in focus, information concerning one or more zoom levels used to present a parent webpage, and information concerning whether an IFrame containing the advertisement is displaying scrollbars.

For example, some browsers expose an API or similarly accessible property that indicates whether a webpage is being viewed at a zoom or not, and the amount of zoom used to view the page (sometimes referred to as "zoom level"). The zoom level a webpage is viewed at may change what is visible within the browser viewport for that webpage. For example, if a page is viewed at a 200% zoom level, then there may be a higher likelihood that objects that would otherwise be visible at a 100% zoom level will no longer be visible or will only be partially visible in the browser viewport. Accordingly, in some embodiments, the zoom information can be accessed to assist in the determination of whether a particular image or object on a webpage is visible on the screen.

For example, it may be determined that an advertisement is likely visible or non-visible within a browser viewport or on a device screen using one or more of the above-described techniques. In some embodiments, such a determination may assume a normal 100% zoom level. If it is determined that the zoom level of the browser has changed, then it may be determined whether an advertisement that should be visible at a 100% zoom level would also likely be visible at a different zoom level.

In some embodiments, client-side code may determine the zoom offset used by the browser. The zoom offset may refer to the area of the browser's viewport that is expanded when a zoom level is increased. For example, in some browsers, zooming in may cause the top-left portion of the webpage displayed in the viewport to remain stationary while the height and width of the webpage is decreased by virtue of magnification. In other browsers, the center of the webpage displayed in the viewport may remain stationary such that top, bottom, left, and right portions of the webpage are pushed off of the viewport when a user scrolls in.

Once the zoom level and the zoom offset of the browser have been determined, it may be deduced whether an advertisement would be visible by determining whether an advertisement having a known position within the viewport would remain in the viewport by determining whether that position would have been pushed off the viewport or expanded within the viewport based on the relation of the position to the offset. For example, an advertisement may be positioned at X-Y coordinates (0, 0) within a 1024×768-pixel viewport under a normal 100% zoom level. The advertisement may also have dimensions 200×100 pixels. At some point, it may be determined that the browser zoom level has increased to 200%, which would result in a 512×384-pixel viewport. If the zoom offset for the browser is such that the browser expands or contracts the webpage display while keeping the top-left portion of the webpage stationary at the origin, then it may be determined that the zooming operation did not result in the advertisement becoming non-visible, because its position and dimensions still fit within the modified viewport. However, if the zoom offset for the browser is such that the browser expands or contracts the webpage display while keeping the center of the portion of the webpage that is displayed in the viewport stationary, then it may be determined that the top 256 pixels, the bottom 256 pixels, the leftmost 192 pixels, and the rightmost 192 pixels have been pushed off the viewport as a result of the zoom increase. Because the advertisement would fit entirely within the pushed-off areas of the webpage, it may be deduced that the advertisement would not be visible at the 200% zoom level.

In some embodiments, zoom information can be deduced even if the browser does not expose any zoom information or if such information is not otherwise available. For example, in some browsers the dimensions of a viewport may be represented by DOM inner-height and inner-width DOM properties. At the same time, the dimensions of the full browser window, including areas of the browser window outside of the viewport—such as menu bars, toolbars, status information on the bottom of the window, scroll bars, etc.—may be represented by DOM outer-height and outer-width properties. Under normal 100% zoom level conditions, such inner and outer dimensions may vary by a specified number of pixels. For example, the full browser window may typically have a height that is 200 pixels larger than the viewport and a width that is 100 pixels larger than the viewport.

In some browsers, a change in zoom level may result only in a change of dimensions for the viewport (the "inner" dimensions), while the dimensions of the full browser window (the "outer" dimensions) may remain constant. Thus, in some embodiments, it may be determined that a browser viewport has been zoomed to a non-100% level by determining that the differences between the dimensions of the viewport and the dimensions of the browser window have changed beyond their normal values (e.g., 200 pixels and 100 pixels). If the differences have increased, then it may be deduced that the zoom level has increased. By contrast, if the differences have decreased, then it may be deduced that the zoom level has decreased. In either case, such difference values from before and after a zoom operation has occurred may be compared to derive a difference ratio that can be converted into an absolute or approximate numerical zoom level. In other embodiments, other or additional properties could be analyzed to deduce zoom information.

In some embodiments, information concerning whether an IFrame containing the advertisement is displaying scrollbars can also be used to determine whether the advertisement is visible. For example, in some embodiments, if an IFrame has identical or substantially commensurate dimensions as an advertisement contained within the IFrame, then the presence of scrollbars may indicate that only a portion of the IFrame—and, hence, the advertisement—is visible.

Techniques from any of the above-described embodiments may be combined to enhance the accuracy or confidence level of visibility determinations, or to provide enhanced or complemented metrics about visibility. In any of the above-described embodiments, visibility information or determinations may be reported to one or more external devices or simply made available to other webpage scripts, browser processes, operating system processes, or other device processes. For example, in some embodiments, visibility code could record ad-visibility information within one or more HTTP cookies that are stored in volatile or persistent memory and are subsequently transmitted to one or more servers. In other embodiments, ad-visibility information could be recorded within one or more global variables that are accessible by other scripts, processes, or devices. In still other embodiments, visibility information may be written to a rendered webpage in a browser or features of the webpage may be modified in response to the visibility information. Those skilled in the art will appreciate that the manner in which ad-visibility information is recorded or reported to another script, process, or device is not limited to any one technique or embodiment.

Regardless of how ad-visibility information is collected, stored, or reported, it may be used in a variety of different ways for a variety of different purposes, such as for optimization of content delivery or maximizing advertisement visibility. For example, ad-visibility information may be reported back to publishers. From that information, publishers may be able to determine that advertisements positioned within certain areas of their webpages have lower visibility success rates than advertisements positioned within other areas. As a result, publishers may reformat their webpages to place advertisements in areas of their webpages in which they are more likely to be visible. Similarly, ad-visibility information may be reported to advertisers so that they may determine which publishers have the highest visibility success rates and may select or winnow publishers accordingly.

In some embodiments, if ad-visibility information reveals that a particular advertisement is frequently only partially visible across a number of different publishers, the advertiser may conclude that the advertisement, as currently designed, is too large, and may reduce or redesign the advertisement accordingly. Still further, in some embodiments, visibility code may make a determination as to whether a particular area of a webpage is visible (or likely to become visible) by using one or more of the above techniques before any advertisement is downloaded. The visibility code may then cause an advertisement to be downloaded from an ad-server or third-party ad network and placed in the webpage area only if it first determines that the webpage area is visible, has been visible, or is likely to become visible. Those skilled in the art will appreciate the foregoing uses of ad-visibility information are exemplary only, and that many other uses of ad-visibility information may be made in order to optimize or target advertisements or to make business arrangements between different parties more economically efficient or fair.

In some embodiments, rather than arriving at a binary determination as to whether an advertisement was likely visible or likely not visible, confidence levels may instead be employed. For example, if it is determined that an advertisement has only one draw-count, or only a small number of draw-counts, then that advertisement may be given a low confidence rating by the visibility code and/or a metric server, which may reflect a low confidence that the advertisement was actually visible or viewed by a user. By contrast, if it is determined that an advertisement has a high draw-count, then that advertisement may be given a high confidence rating by the visibility code and/or a metric server, which may reflect a high confidence that the advertisement was actually visible or viewed by a user.

Other factors determined by the visibility code, such as one or more of the factors described above, may also add to or subtract from an assigned confidence rating. For example, an advertisement's confidence level may be increased if a MouseOver event is detected with respect to the advertisement. Similarly, the visibility confidence level assigned to an advertisement may be increased or decreased if a detected or inferred zoom level, as described above either supports or weighs against the likelihood that an advertisement was actually visible in the browser application.

In some embodiments, confirmed views that have confidence levels below a certain threshold may be disqualified, such that publishers are not credited with or compensated for impressions. In other embodiments, the extent of credit or compensation awarded to publishers may be commensurate with the confidence levels of their confirmed views. Confidence levels may be determined by visibility code resident on a client device or by a metric server to which visibility information is reported.

Although the disclosed embodiments have been described primarily in the context of implementation using executable or interpretable code (used interchangeably unless otherwise specified) provided as part of an ad-code or IFrame, the above-described operations may be performed by a browser using any means. For example, the above-described operations may be performed by code that operates within a sandbox environment, such as a Java applet, Flash™ or Silverlight™ code associated with an advertisement, or other code that may be transmitted to a browser by an external server in connection with a webpage. Any of the above-described operations may also be performed by a browser plug-in, add-on, or extension that is downloaded and locally installed on a client device. Similarly, any browser itself may be designed or modified to provide native API functionality for determining information about the visibility of an advertisement and storing or reporting that information, for example using techniques described above. Or, in some embodiments, the browser itself may perform one or more of the above ad-visibility operations with or without the help of client-side code obtained from a server or with respect to a particular advertisement.

In some embodiments, visibility code that is executed on the client device may be structured such that it is neither in the delivery path of the advertisement nor does it participate in the drawing of the advertisement itself. For example, as depicted in FIG. 7, browser 715 may download advertisement 770 and visibility code 780 from separate servers, such as ad-server 730 and metric server 740, respectively. In this example, metric server 740 does not participate in the delivery path of advertisement 770, nor does it have any control over the advertisement served. Similarly, visibility code 780 neither instructs browser 715 to download advertisement 770 nor instructs browser 715 to draw advertisement 770.

Rather, as further depicted in FIG. 8, in some embodiments, visibility code 820 may be structured to monitor only the browser's interaction with the advertisement (for example, image file 812) and not to interact with the advertisement itself. Thus, visibility code may be used to monitor the visibility of any advertisement, even if the visibility code, as transmitted to the browser, has little or no prior information about the advertisement. In this manner, a publisher, advertiser, ad-server, or other entity may use visibility code provided by a third party (e.g., metric server 740) without necessarily having to involve another entity in the process.

For example, as depicted in FIG. 8, when ad-code content 810 instructs the browser to retrieve visibility code from metric server 740 using tag 814, ad-code content 810 passes information identifying the advertisement object to be monitored to the visibility code using a variety of techniques such as, for example, by transmitting the URL parameter "ad_name=ad_06131954." By receiving this information, metric server 740 is able to send visibility code 820 that monitors the browser's interaction with the advertisement supplied by ad-server 730 using the advertisement object's ID within the webpage DOM (see code segment 822). In other embodiments, additional information (e.g., object type) or less information may be supplied.

In any case, however, visibility code may be able to operate separately from the delivery or drawing of the advertisement. For example, if the browser is not able to download the advertisement for any reason, then the visibility code may still be able to operate. For example, the visibility code may determine that the advertisement is not listed in the webpage DOM and may therefore determine that the advertisement was not visible in the browser. Further, if the visibility code operates separate from the delivery or drawing of the advertisement, then in some embodiments, any failure of the visibility code to be downloaded correctly or to operate correctly will not affect the browser's ability to download and display the advertisement. These embodiments may, therefore, be distinguished from visibility code that participates in the downloading or drawing of the advertisement, that interacts with the advertisement, or that is not sufficiently separate from the advertisement such that the failure of one would affect the other, as may be the case for some implementations involving sandbox code, such as Flash™, Silverlight™, or Java applets.

In some embodiments, visibility code may also be structured to interact only with a browser or other application that is responsible for displaying one or more advertisements. For example, as depicted in FIG. 8, exemplary visibility code 820 may be structured to interact only with the methods and properties provided by browser 715—here, JavaScript DOM methods and properties provided by browser 715. Thus, in such embodiments, visibility code 820 does not execute natively on device 710 or make use of operating system libraries, system calls, or other functions. Again, these features of visibility code 820 may distinguish it from some implementations involving sandbox code or other code that operates natively on client device 710.

The disclosed embodiments are also not limited to online advertisements, such as advertisements incorporated into webpages, but may also be applied to any kind of content for which it is desired to determine the extent of visibility on one or more client devices. For example, recent advances in mobile device technology, such as smartphones and tablets, have led to an increase in the number of mobile applications (or "apps") available for download. Frequently, developers will offer free versions of mobile apps that generate revenue by displaying advertisements to users when the apps are used on mobile devices. If third-party advertisers pay app developers on a per-view basis, then advertisers may wish to ensure that advertisements are not merely incorporated into mobile apps, but are also displayed in visible areas of mobile device screens. Thus, one or more of the above-described techniques for determining ad-visibility may be performed by an advertisement container downloaded by a mobile device, a mobile app that incorporates the advertisement, and/or the mobile device itself.

The above-described techniques may also be used to determine and report ad-visibility in the context of a traditional computer application or plug-in, desktop widget, etc. For example, a plug-in toolbar extension to a desktop application, such as a web browser, may also display advertisements, and thus it may be beneficial to ensure portions of the toolbar that display advertisements are actually visible in the parent application. Thus, in some embodiments, visibility code may generally reside on a client device (e.g., as part of an application installed on the client device), rather than being downloaded, or may be used to measure visibility of a plurality of different advertisements that may be received by the client device.

The disclosed embodiments are also not: limited to advertisements, but may be used in any situation in which it is desirable to determine the visibility of content, such as an image, on a device screen, whether in connection with a mobile application, a web browser, or a different application that is running locally on a client device. Moreover, although described in the context of HTTP communications, the invention is not limited to any particular open systems interconnection (OSI) layer; rather, any suitable application, presentation, session transport, network, data link, or physical protocol may be used, whether as part of the OSI model or as a standalone protocol.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, although screen-draw-counts have been described primarily with respect to images, information regarding other types of webpage elements, such as text, "div" or "span" elements, IFrames, etc., may also be measured to determine visibility if a browser exposes similar screen-draw-count properties for such elements.

Likewise, the steps described need not be performed in the same sequence discussed or with the same degree of separation. Various steps may be omitted, repeated, combined, or divided, as necessary to achieve the same or similar objectives or enhancements. Accordingly, the invention is not limited to the above-described embodiments, but instead is defined by the appended claims in light of their full scope of equivalents.

In the claims, unless otherwise specified, when a claim recites transmitting, downloading, or receiving "instructions" for performing certain operations, the term "instructions" comprises any set of computer instructions—interpretable, executable, or otherwise—capable of causing a device that receives the instructions, or a device to which the instructions will subsequently be transmitted, to perform the recited operations, even if the received instructions rely on certain methods, functions, libraries, or features provided by the device or software resident on the device that are not themselves part of the received set of instructions. Also, in the claims, unless otherwise specified, terms differentiated by ordinals such as "first," "second," "third," etc., may refer to the same or different devices or objects.

What is claimed is:

1. A method, implemented using a client computing device, of determining visibility of online content downloaded by a web browser application executing on the client computing device that includes a screen, wherein the method comprises:
   transmitting to an external device a set of instructions that cause the web browser application executing on the client computing device to perform operations comprising:
      determining dimensions of the online content included in a webpage displayed within a viewport of the web browser application;
      determining dimensions of an IFrame, wherein:
         the IFrame contains the online content;
         the IFrame is non-friendly;
         the dimensions of the IFrame are greater than the dimensions of the online content;
         the IFrame comprises a first portion that is visible in the viewport and a second portion that is non-visible in the viewport; and
         the first portion of the IFrame coincides with the dimensions of the online content,
      attempting to draw a first reference image onto the webpage within the visible portion of the IFrame over a time period;
      attempting to draw a second reference image within the non-visible portion of the IFrame over the time period;
      determining a draw count for the first reference image and a draw count for the second reference image;
      determining a visibility metric of the online content by comparing the draw count for the first reference image and the draw count for the second reference image; and
      transmitting to a remote server the visibility metric of the online content or information based on the visibility metric of the online content.

2. The method of claim 1, the operations further comprising removing or hiding any scrollbars of the IFrame.

3. The method of claim 1, further comprising adding the first reference image and the second reference image to a document object model (DOM) representing the webpage, wherein:
   the attempting to draw the first reference image comprises drawing the first reference image based on the DOM and a position of the first reference image with respect to the viewport; and
   the attempting to draw the second reference image comprises drawing the second reference image based on the DOM and a position of the second reference image with respect to the viewport.

4. The method of claim 3, wherein the first reference image is a transparent pixel images.

5. The method of claim 1, wherein the visibility metric indicates the online content was visible in the viewport during the time period.

6. A non-transitory computer-readable medium containing instructions embodied thereon, wherein the instructions, if executed by a web browser application running on a client device, cause the web browser application to perform operations comprising:
   determining dimensions of the online content included in a webpage displayed within a viewport of the web browser application;
   determining dimensions of an Iframe wherein:
      the IFrame contains the online content;
      the IFrame is non-friendly;
      the dimensions of the IFrame are greater than the dimensions of the online content;
      the IFrame comprises a first portion that is visible in the viewport and a second portion that is non-visible in the viewport; and
      the first portion of the IFrame coincides with the dimensions of the online content,
   attempting to draw a first reference image onto the webpage within the visible portion of the IFrame over a time period;
   attempting to draw a second reference image within the non-visible portion of the IFrame over the time period;

determining a draw count for the first reference image and a draw count for the second reference image;

determining a visibility metric of the IFrame that represents the location of online content by comparing the draw count for the first reference image and the draw count for the second reference image; and transmitting to a remote server the visibility metric of the online content or information based on the visibility metric of the online content.

7. The computer-readable medium of claim 6, the operations further comprising removing or hiding any scrollbars of the IFrame.

8. The non-transitory computer-readable medium of claim 6, wherein the first reference image is a transparent pixel image.

9. The non-transitory computer-readable medium of claim 6, wherein:

the determining the draw count for the first reference image comprises:

the determining the draw count for the first reference image comprises:

determining a draw count for the first reference image and a draw count for the second reference image;

determining a visibility metric of the online content by comparing the draw count for the first reference image and the draw count for the second reference image; and transmitting to a remote server the visibility metric of the online content or information based on the visibility metric of the online content.

10. The non-transitory computer-readable medium of claim 6, wherein the visibility metric indicates the online content was visible in the viewport during the time period.

11. A method of determining visibility of online content downloaded by a web browser application executing on a client device that includes a screen, wherein the method comprising:

transmitting to an external device a set of instructions that cause the web browser application executing on the client device to perform operations comprising:

determining dimensions of the online content included in a webpage displayed within a viewport of the web browser application;

determining screen coordinates of an IFrame in which the online content is embedded, wherein:

the dimensions of the IFrame are greater than the dimensions of the online content;

the IFrame comprises a first portion that is visible in the viewport and a second portion that is non-visible in the viewport; and the first portion of the IFrame coincides with the dimensions of the online content, placing a first reference image onto the webpage within the visible portion of the IFrame;

placing a second reference image within the non-visible portion of the IFrame;

determining a draw count for the first reference image and a draw count for the second reference image over a predetermined time period;

for each repeated attempt to draw the first reference image during the time period, determining whether the first reference image was drawn within the viewport; and incrementing the draw count for the first reference image based on the determining whether the first reference image was drawn; and the determining the draw count for the second reference image comprises:

for each repeated attempt to draw the second reference image during the time period, determining whether the second reference image was drawn within the viewport; and incrementing the draw count for the second reference image based on the determining whether the second reference image was drawn.

12. A method of determining visibility of online content downloaded by a web browser application executing on a client computing device, the method comprising:

transmitting to an external device a set of instructions that cause the web browser application executing on the client computing device to perform operations comprising:

displaying a webpage within a viewport of the web browser application, the webpage including an IFrame containing the online content, wherein:

the IFrame is non-friendly;

the IFrame comprises a first portion that is visible in the viewport and a second portion that is non-visible in the viewport; and the first portion of the IFrame coincides with the online content;

attempting to draw a first reference image onto a webpage within the visible portion of an IFrame over a time period;

attempting to draw a second reference image within a non-visible portion of the IFrame over the time period;

determining a visibility metric of the online content by comparing the draw count for the first reference image and the draw count for the second reference image; and transmitting to a remote server the visibility metric of the online content or information based on the visibility metric of the online content.

* * * * *